(12) United States Patent
Takeda et al.

(10) Patent No.: US 9,420,593 B2
(45) Date of Patent: Aug. 16, 2016

(54) COMMUNICATION SYSTEM, BASE STATION APPARATUS, MOBILE TERMINAL APPARATUS AND COMMUNICATION METHOD

(71) Applicant: NTT DOCOMO, INC., Tokyo (JP)

(72) Inventors: Kazuaki Takeda, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 58 days.

(21) Appl. No.: 14/386,185

(22) PCT Filed: Feb. 28, 2013

(86) PCT No.: PCT/JP2013/055482
§ 371 (c)(1),
(2) Date: Sep. 18, 2014

(87) PCT Pub. No.: WO2013/140987
PCT Pub. Date: Sep. 26, 2013

(65) Prior Publication Data
US 2015/0049699 A1 Feb. 19, 2015

(30) Foreign Application Priority Data
Mar. 19, 2012 (JP) ................................. 2012-062689

(51) Int. Cl.
*H04W 4/00* (2009.01)
*H04W 72/08* (2009.01)
(Continued)

(52) U.S. Cl.
CPC ............. *H04W 72/085* (2013.01); *H04J 11/00* (2013.01); *H04L 1/1671* (2013.01);
(Continued)

(58) Field of Classification Search
CPC ... H04W 72/04; H04W 72/085; H04W 16/32; H04W 24/10; H04L 5/001; H04L 5/0053; H04L 5/0057; H04L 5/0073; H04J 11/00
See application file for complete search history.

(56) References Cited

U.S. PATENT DOCUMENTS 8,023,990 B2    9/2011  Parkvall
2010/0150085 A1*  6/2010  Ishii .......................... H04L 1/00
                                                              370/329
(Continued)

FOREIGN PATENT DOCUMENTS

JP      2011-515943 A    5/2011
WO      2010/104957 A2   9/2010

OTHER PUBLICATIONS

Qualcomm Incorporated; "UCI Transmission Enhancements;" 3GPP TSG-RAN WG1 #66, R1-112552; Athens, Greece; Aug. 22-26, 2011 (3 pages).

(Continued)

*Primary Examiner* — Kevin Mew
(74) *Attorney, Agent, or Firm* — Osha Liang LLP

(57) ABSTRACT

The present invention is designed to trigger a PUSCH dynamically or periodically in an S-cell upon carrier aggregation in a HetNet and transmit UCI efficiently. In the communication system of the present invention, a mobile terminal apparatus reserves physical uplink shared channel resources in a second carrier by higher layer signaling, and transmits uplink control information combining ACK/NACK for a physical downlink shared data channel allocated by a downlink scheduling assignment and a CQI report triggered by the downlink scheduling assignment, to a second base station apparatus, using one of the reserved physical uplink shared channel resources.

13 Claims, 12 Drawing Sheets

(51) Int. Cl.

| | | |
|---|---|---|
| *H04J 11/00* | (2006.01) | |
| *H04W 16/32* | (2009.01) | |
| *H04W 24/10* | (2009.01) | |
| *H04W 72/04* | (2009.01) | |
| *H04L 5/00* | (2006.01) | |
| *H04L 1/16* | (2006.01) | |
| *H04L 1/18* | (2006.01) | |
| *H04L 1/00* | (2006.01) | |

(52) U.S. Cl.
CPC ............. *H04L 1/1864* (2013.01); *H04L 5/001* (2013.01); *H04L 5/0055* (2013.01); *H04L 5/0057* (2013.01); *H04W 16/32* (2013.01); *H04W 24/10* (2013.01); *H04W 72/04* (2013.01); *H04L 1/0026* (2013.01); *H04L 5/0073* (2013.01)

(56) References Cited

U.S. PATENT DOCUMENTS

| | | | | |
|---|---|---|---|---|
| 2010/0232382 | A1 | 9/2010 | Gauvreau et al. | |
| 2011/0026642 | A1* | 2/2011 | Kawamura | H04L 1/1861 375/316 |
| 2011/0085513 | A1* | 4/2011 | Chen | H04W 72/042 370/330 |
| 2011/0170496 | A1* | 7/2011 | Fong | H04L 5/0053 370/329 |
| 2011/0211510 | A1* | 9/2011 | Kim | H04L 1/16 370/311 |
| 2011/0249578 | A1* | 10/2011 | Nayeb Nazar | H04L 1/0027 370/252 |
| 2011/0286436 | A1* | 11/2011 | Suzuki | H04L 1/1692 370/336 |
| 2011/0317653 | A1* | 12/2011 | Kwon | H04L 1/1861 370/329 |
| 2012/0009963 | A1* | 1/2012 | Kim | H04L 5/001 455/509 |
| 2012/0039285 | A1* | 2/2012 | Seo | H04L 1/1671 370/329 |
| 2012/0113831 | A1* | 5/2012 | Pelletier | H04L 5/0058 370/252 |
| 2013/0163535 | A1* | 6/2013 | Anderson | H04W 72/04 370/329 |
| 2013/0265914 | A1* | 10/2013 | Ahn | H04B 7/2656 370/280 |
| 2015/0103705 | A1* | 4/2015 | Yang | H04L 1/1861 370/280 |

OTHER PUBLICATIONS

NTT DOCOMO; "UL Control Signaling Enhancements for Rel-11 CA Scenarios;" 3GPP TSG RAN WG1 Meeting #68, R1-120397; Dresden, Germany Feb. 6-10, 2012 (4 pages).

3GPP TR 25.913 V9.0.0; "3rd Generation Partnership Project; Technical Specification Group Radio Access Network; Requirements for Evolved UTRA (E-UTRA) and Evolved UTRAN (E-UTRAN) (Release 9)" Dec. 2009 (18 pages).

3GPP TS 36.212 V9.3.0; "3rd Generation Partnership Project; Technical Specification Group Radio Access Network; Evolved Universal Terrestrial Radio Access (E-UTRA); Muliplexing and channel coding (Release 9)" Sep. 2010 (61 pages).

International Search Report for corresponding International Application No. PCT/JP2013/055482, mailed May 7, 2013 (2 pages).

Office Action issued in corresponding Japanese Application No. 2012-062689, mailed Feb. 2, 2016 (4 pages).

* cited by examiner

| TRIGGERING BIT | STATE |
|---|---|
| 00 | NO TRIGGERING |
| 01 | PRB INDEX1 CONFIGURED BY HIGHER LAYER |
| 10 | PRB INDEX2 CONFIGURED BY HIGHER LAYER |
| 11 | PRB INDEX3 CONFIGURED BY HIGHER LAYER |

FIG.4

COMMUNICATION SYSTEM, BASE STATION APPARATUS, MOBILE TERMINAL APPARATUS AND COMMUNICATION METHOD

TECHNICAL FIELD

The present invention relates to a base station apparatus, a mobile terminal apparatus, a communication system and a communication method in a next-generation mobile communication system.

BACKGROUND ART

In a UMTS (Universal Mobile Telecommunications System) network, long-term evolution (LTE) has been under study for the purposes of further increasing high-speed data rates, providing low delay and so on (non-patent literature 1). In LTE, as multiple access schemes, a scheme that is based on OFDMA (Orthogonal Frequency Division Multiple Access) is used on downlink channels (downlink), and a scheme that is based on SC-FDMA (Single Carrier Frequency Division Multiple Access) is used on uplink channels (uplink).

In the LTE system, uplink signals are mapped to adequate radio resources and transmitted from a mobile terminal apparatus to a radio base station apparatus. To be more specific, uplink user data is transmitted using an uplink shared channel (PUSCH: Physical Uplink Shared Channel). Also, uplink control information (UCI) is transmitted using the PUSCH when transmitted with uplink user data, and transmitted using an uplink control channel (PUCCH: Physical Uplink Control Channel) when transmitted alone.

The uplink control information (UCI) includes a delivery acknowledgment (ACK/NACK) in response to a downlink shared channel (PDSCH: Physical Downlink Shared Channel), a scheduling request, channel state information (CSI), and so on (see, for example, non-patent literature 2). The channel state information (hereinafter referred to as "CSI") refers to information that is based on the instantaneous downlink channel state, and includes, for example, channel quality information (CQI), a precoding matrix indicator (PMI), a rank indicator (RI) and so on. This CSI is reported from a mobile terminal apparatus to a radio base station apparatus periodically or aperiodically.

Meanwhile, successor systems of LTE (referred to as, for example, "LTE-Advanced" or "LTE enhancement" (hereinafter referred to as "LTE-A")) are under study for the purpose of achieving further broadbandization and increased speed beyond LTE. In LTE-A (Rel-10), high peak data rates are achieved by grouping a plurality of component carriers (CCs), where the system band of the LTE system is one unit, to provide a wide band (carrier aggregation). Also, an overlay network (HetNet: Heterogeneous Network) configuration to provide base stations of varying transmission power and various formats such as pico base stations, femto base stations and RRH (Remote Radio Head) base stations, in addition to conventional macro base stations, is under study. In 3GPP, time-domain interference coordination (eICIC: enhanced Inter-Cell Interference Coordination) has been standardized, as an interference coordination technique in a HetNet, to achieve further expansion of system capacity.

CITATION LIST

Non-Patent Literature

Non-Patent Literature 1: 3GPP TR 25.913 "Requirements for Evolved UTRA and Evolved UTRAN"

Non-patent Literature 2: 3GPP, TS 36.212 (V.9.3.0), "Multiplexing and Channel Coding," November 2010

SUMMARY OF THE INVENTION

Technical Problem

Now, future systems (Rel-11 and later versions) anticipate carrier aggregation that takes into account improvement of spectral efficiency and reduction of interference caused in a HetNet. When carrier aggregation is carried out using a component carrier of a macro base station eNB as a P-cell (primary cell) and a component carrier of a pica base station as an S-cell (secondary cell), a PUCCH for transmitting UCI is set only in the P-cell. A mobile terminal apparatus measures CQI, which is an indicator to show downlink channel received quality, in predetermined frequency units, and reports information about the measured CQI to a base station (evolved Node B) through the PUCCH. Consequently, when there is no PUSCH transmission by the P-cell, the ACK/NACK and CQI in response to the PDSCH which the mobile terminal apparatus receives in the S-cell are transmitted using only the PUCCH of the P-cell.

However, when assuming carrier aggregation in a HetNet, it may occur that the amount of ACK/NACK data in response to the PDSCH received in the S-cell increases, and so there is a possibility that the PUCCH resources of the P-cell may run short. When an ACK/NACK and a CQI collide in the PUCCH resources of the P-cell, the ACK/NACK is transmitted preferentially, and, as a result of this, there is a possibility that the frequency CQIs drop increases, and, when the CQIs of the S-cell drop frequently, there is a problem that the accuracy of scheduling with respect to the S-cell lowers.

The present invention has been made in view of the above, and it is therefore an object of the present invention to provide a communication system, a base station apparatus, a mobile terminal apparatus and a communication method that can reduce the frequency CQIs drop upon carrier aggregation in a HetNet and transmit UCI with high efficiency.

Solution to Problem

The communication system of the present invention is a communication system to control a plurality of carriers such that a mobile terminal apparatus communicates with a first base station apparatus using a first carrier and communicates with a second base station apparatus using a second carrier, which is different from the first carrier, and, in this communication system, the second base station apparatus reports at least one physical uplink shared channel resource of the second carrier by higher layer signaling to signal to the mobile terminal apparatus, and allocates a physical downlink shared data channel to the second carrier by a downlink scheduling assignment to signal to the mobile terminal apparatus and also triggers a channel quality report in accordance with need, and the mobile terminal apparatus reserves the physical uplink shared channel resource of the second carrier reported by the higher layer signal, and allocates the reserved physical uplink shared channel resource to the second carrier by the downlink scheduling assignment and transmits the channel quality report to the second base station apparatus.

In the above communication system, the mobile terminal apparatus transmits uplink control information, which includes ACK/NACK for the physical downlink shared data channel that is allocated by the downlink scheduling assignment and the CQI report that is triggered by the downlink scheduling assignment, to the second base station apparatus using the physical uplink shared channel resource allocated by the downlink scheduling assignment.

Technical Advantage of the Invention

According to the present invention, it is possible to build a system that can reduce the frequency CQIs drop upon carrier aggregation in a HetNet, and transmit UCI with high efficiency.

BRIEF DESCRIPTION OF THE DRAWINGS

FIG. 4 is a diagram to show triggering bit configurations of PUSCH resources;

DESCRIPTION OF EMBODIMENTS

Figure 1:
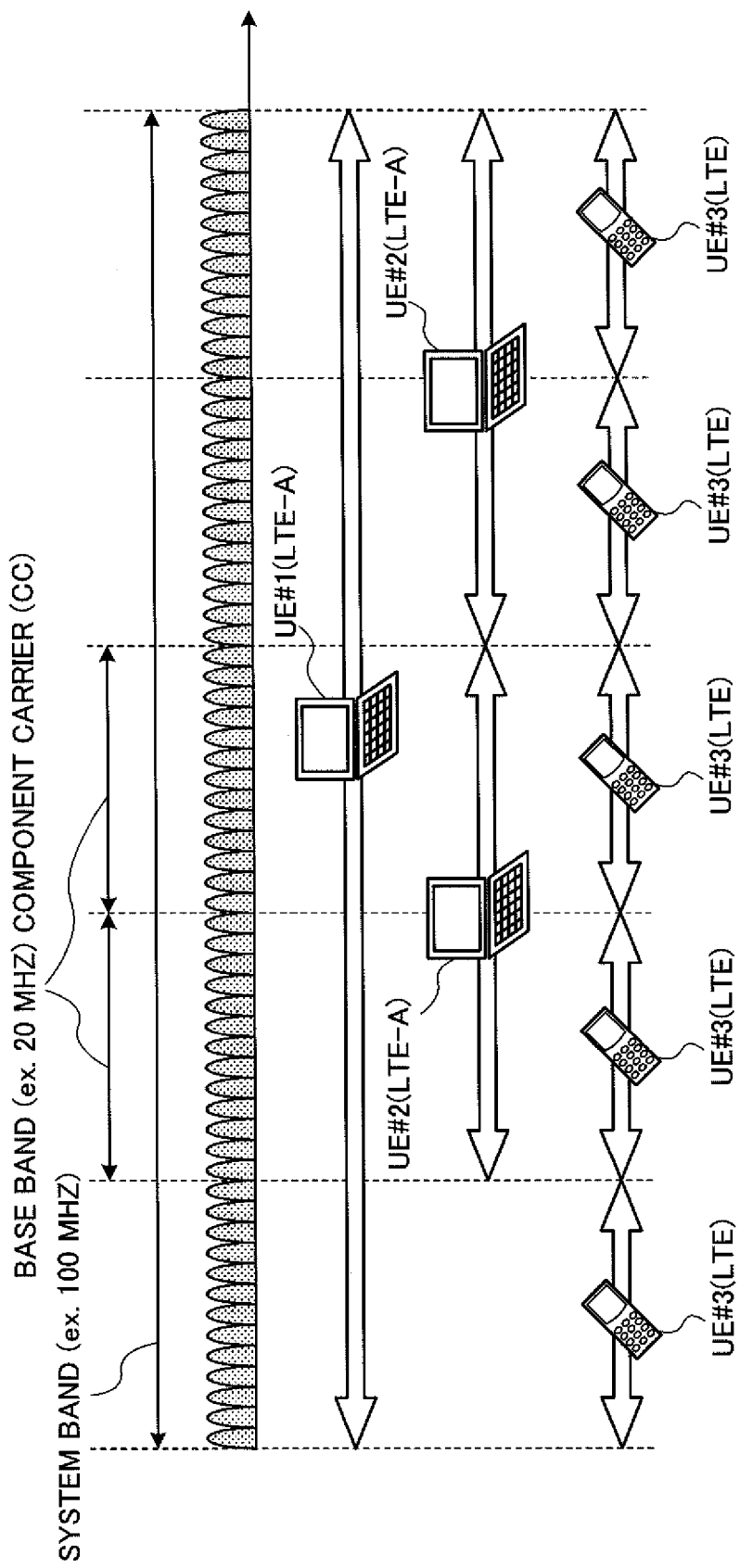
FIG. 1 is a diagram to explain a system band in an LTE-A system.

FIG. 1 is a diagram to show a layered bandwidth configuration defined in LTE-A. The example shown in FIG. 1 is a layered bandwidth configuration that is used when an LTE-A system having a first system band formed with a plurality of component carriers (fundamental frequency blocks) and an LTE system having a second system band formed with one component carrier coexist. In the LTE-A system, for example, radio communication is performed in a variable system bandwidth of 100 MHz or below, and, in the LTE system, for example, radio communication is performed in a variable system bandwidth of 20 MHz or below. The system band of the LTE-A system includes at least one component carrier, where the system band of the LTE system is one unit.

For example, in FIG. 1, the system band of the LTE-A system is a system band to include bands of five component carriers (20 MHz×5=100 MHz), where the system band (base band: 20 MHz) of the LTE system is one component carrier. In FIG. 1, mobile terminal apparatus UE (User Equipment) #1 is a mobile terminal apparatus to support the LTE-A system (and also support the LTE system), and is able to support a system band up to 100 MHz. UE #2 is a mobile terminal apparatus to support the LTE-A system (and also support the LTE system), and is able to support a system band up to 40 MHz (20 MHz×2=40 MHz). UE #3 is a mobile terminal apparatus to support the LTE system (and not support the LTE-A system), and is able to support a system band up to 20 MHz (base band).

Future systems (Rel-11 and later versions) anticipate expansion of carrier aggregation specialized for a HetNet. To be more specific, system configurations such as the one shown in FIG. 2 may be possible. FIG. 2 provides diagrams to show examples of carrier aggregation in a HetNet.

Figure 2A:
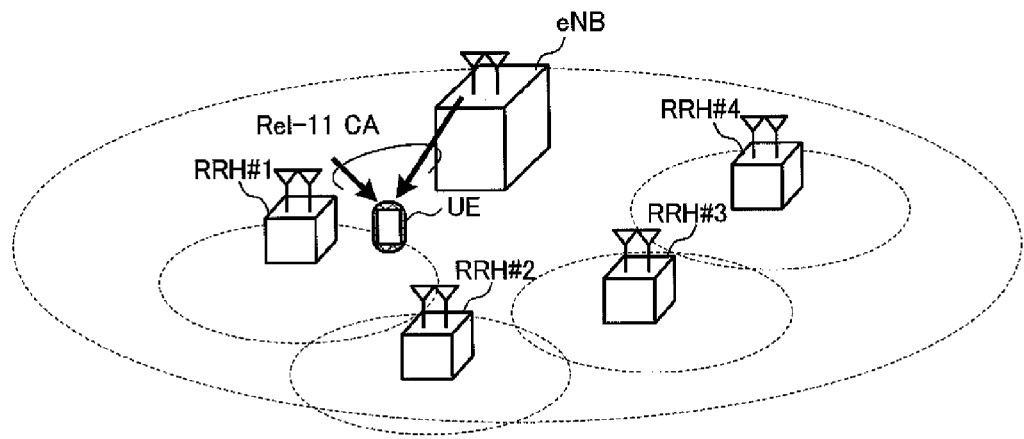
FIG. 2 provides diagrams to show examples of carrier aggregation in a HetNet.

The system shown in FIG. 2A is configured in layers with a base station eNB (eNodeB) and a plurality of base stations (for example, RRHs (Remote Radio Heads)). Inside the cell of the base station eNB, small cells (low transmission power) are formed locally by the RRHs. A mobile terminal apparatus UE is located in the small cell of RRH #1, and communicates with the base station eNB and RRH #1 by means of carrier aggregation. For example, carrier aggregation is executed using component carrier CC #1 of the base station eNB as a P-cell and using component carrier CC #2 of base station apparatus RRH #1 as an S-cell.

To carry out carrier aggregation, the mobile terminal apparatus UE detects an RRH (S-cell) by inter-frequency measurement while being connected with the base station eNB. After having captured synchronization with a PSS/SSS (Primary Synchronization Signal/Secondary Synchronization Signal), which are synchronization signals, the mobile terminal apparatuses UE measures the inter-frequency received quality from each RRH based on CRSs (Cell-specific Reference Signals). Then, the measured signal quality from each RRH and a predetermined target value are compared, and an RRH (S-cell) of good received quality is detected.

Now, in Rel-11, a carrier without compatibility with conventional component carriers of carrier aggregation is under study, and this is effective in a HetNet where carrier aggregation is applied. A carrier without compatibility with conventional component carriers may be referred to as an "additional carrier type" or may be referred to as an "extension carrier."

Figure 2B:
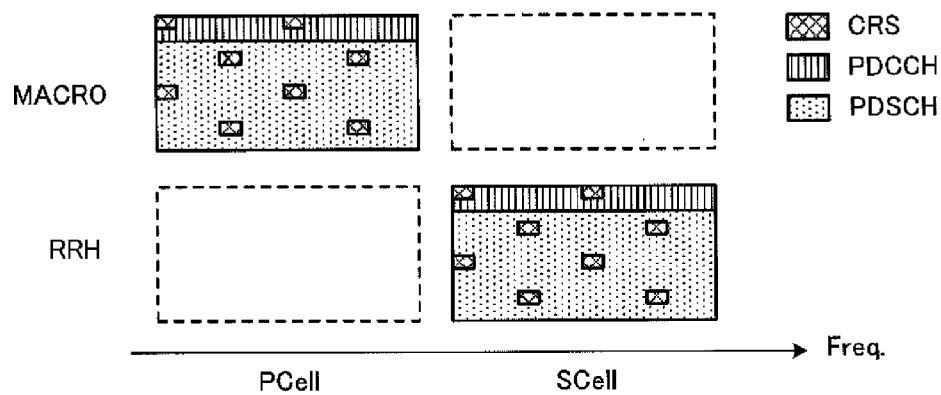
Figure 2C:
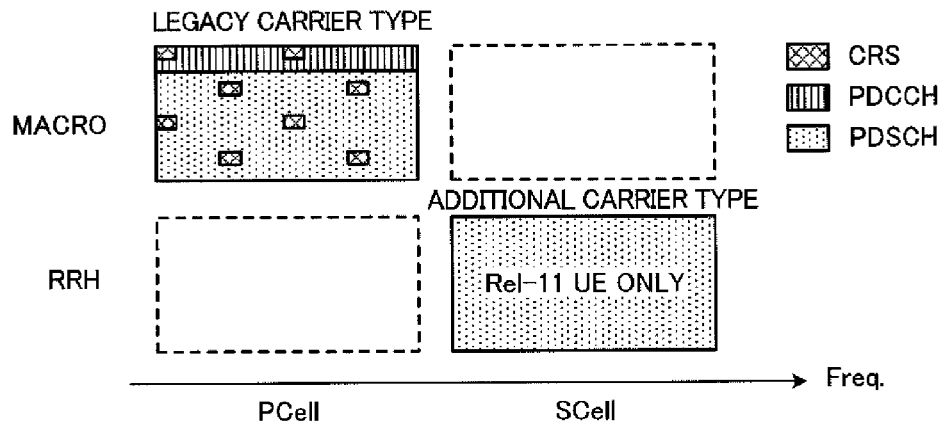

FIG. 2B shows a state in which component carrier CC #1 allocated to the base station eNB and component carrier CC #2 allocated to an RRH are both set in a legacy carrier type. FIG. 2C is a diagram to show an example of carrier aggregation using an additional carrier type. CC #1 allocated to the base station eNB is set in a legacy carrier type and component carrier CC #2 allocated to the RRH is set in an additional carrier type. Note that FIGS. 2B and 2C show only CRSs, PDCCHs, and PDSCHs for ease of description.

As shown in FIG. 2B, in the legacy carrier type, in one resource block defined in LTE, a PDCCH is set over maximum three symbols from the top. Also, in the legacy carrier type, in one resource block, CRSs are set not to overlap with user data and other reference signals such as DM-RSs (Demodulation-Reference Signals). The CRSs are used to demodulate user data, and, besides, used to measure downlink channel quality (CQI: Channel Quality Indicator) for scheduling and adaptive control, and used to measure the average downlink propagation path state for a cell search and handover (mobility measurement).

By contrast with this, as shown in FIG. 2C, the additional carrier type is able to make the PDCCHs and CRSs subject to non-transmission. This additional carrier type is not supported by conventional mobile terminal apparatuses (Rel-10 and earlier versions) and is supported only by new mobile terminal apparatus UEs (Rel-11 and later versions). Also, the additional carrier type can make downlink control channels (PHICH and PCFICH) subject to non-transmission and make broadcast information (PBCH, Rel-8 SIB, and paging) subject to non-transmission as well. Also, the additional carrier type is expected to be used primarily in S-cells.

Note that, with the additional carrier type, when CRSs are not transmitted, it is also possible to use, for example, user-specific DM-RSs for data demodulation and use CSI-RSs (Channel State Information-Reference Signals) for CSI measurement. Also, with the additional carrier type, when a PDCCH is not transmitted, it is possible to transmit an FDM-type PDCCH. The FDM-type PDCCH uses a predetermined frequency band in the PDSCH region for downlink data signals as an enhanced PDCCH region. The FDM-type PDCCH allocated to this enhanced PDCCH region is demodulated using DM-RSs. Note that an enhanced PDCCH may be referred to as a "UE-PDCCH."

When, with the additional carrier type, a PDCCH is subject to non-transmission, it is also possible to utilize cross-carrier scheduling. Cross-carrier scheduling refers to the method of transmitting the downlink control channel for the subject carrier using a different carrier. For example, instead of transmitting a downlink control channel using a carrier of the additional carrier type, the downlink control channel may be transmitted using a carrier of the legacy carrier type.

When the additional carrier type makes a PHICH (Physical Hybrid-ARQ Indicator Channel) subject to non-transmission, it is equally possible to perform retransmission control using downlink control information (DCI). When the additional carrier type makes a PCFICH (Physical Control Format Indicator Channel) subject to non-transmission, it is equally possible to report the number of OFDM symbols to use for the PDCCH by higher layer signaling. When the additional carrier type makes broadcast information subject to non-transmission, it is equally possible to transmit the broadcast information from a carrier of the legacy carrier type.

Note that, although an example to make CRSs and a downlink control channel subject to non-transmission has been shown as the additional carrier type according to the present embodiment, this configuration is by no means limiting. For example, as the additional carrier type, it is equally possible to apply a configuration that makes at least one of CRSs and a downlink control channel subject to non-transmission or that reduces part of the signals. Also, the bandwidth of the additional carrier type does not have to make the system band (base band: 20 MHz) of the LTE system one unit, and can be changed as appropriate.

With the present system, interference due to CRSs is reduced by executing carrier aggregation using the legacy carrier type and the additional carrier type. That is, since the additional carrier type can make CRSs subject to non-transmission, it is possible to reduce the interference caused by CRSs from neighboring base stations (RRHs and so on), and, for example, receive downlink signals from S-cells having better received quality than the P-cell. Also, since the CRS and PDCCH resources become unoccupied, a configuration to transmit downlink data in them may improve spectral efficiency.

When a mobile terminal apparatus detects an S-cell (RRH) of good received quality, on the uplink, too, it is preferable to transmit uplink signals (PUSCH and PUCCH) from that S-cell of good received quality. However, when the mechanism of carrier aggregation provided for in Rel-10 is applied, UCI (ACK/NACK and CQI) is transmitted only from the PUCCH of the uplink P-cell (a case where the uplink PUSCH is not triggered). Consequently, even when an S-cell (RRH) of good received quality is detected, UCI (ACK/NACK and CQI) that is transmitted on the uplink is received in the base station eNB.

The present inventors have focused on the fact that, from the perspective of improving efficiency, it is preferable to transmit UCI (ACK/NACK and CQI) for downlink signals that are received on the downlink of a cell of good received quality, from the uplink of the same cell, and arrived at an invention to achieve UCI transmission in an S-cell (UL).

A gist of the present invention is to secure PUSCH resources in an S-cell dynamically or periodically by higher layer signaling, trigger PUSCH resources that are secured in advance in the S-cell by a downlink scheduling assignment (DL assignment), and transmit CQI with ACK/NACK using the above triggered PUSCH resources, in a subframe that comes a predetermined number of subframes later.

Now, the method of dynamically triggering PUSCH resources in an S-cell and transmitting UCI will be described with reference to FIG. 3.

Figure 3:
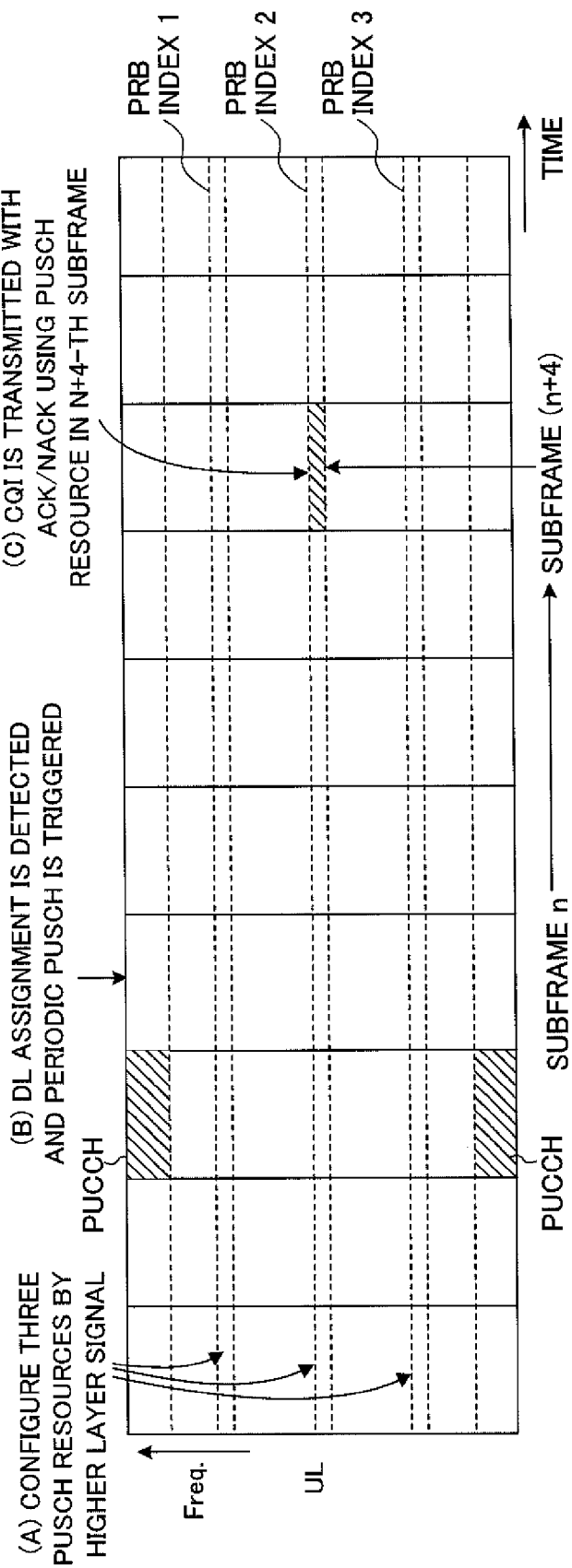
FIG. 3 is a configuration diagram of uplink subframes where dynamic PUSCH resources are triggered.

FIG. 3 shows an example of a configuration of uplink subframes where PUSCH resources are triggered dynamically. A mobile terminal apparatus receives higher layer signaling transmitted from a base station, and reserves a plurality of PUSCH resources with an S-cell on a per subframe basis (FIG. 3(a)).

Here, to "reserve" PUSCH resources may be rephrased as saying that PUSCH resources are "secured temporarily" or "set." However, although a plurality of PUSCH resources are reserved per subframe here, if, in a given subframe, the reserved PUSCH resources are not triggered (that is, not used to transmit UCI), it is possible to use the reserved PUSCH resources to transmit data.

FIG. 3 shows a situation where three PUSCH resources are reserved in one subframe. The reserved PUSCH resources are formed in physical resource block (PRB) units, and are managed with index numbers (PRB index 1, PRB index 2 and PRB index 3). The three reserved PUSCH resources (PRB index 1, PRB index 2 and PRB index 3) may be shared between a plurality of mobile terminal apparatuses. The base station knows the PUSCH resources that are reserved in the mobile terminal apparatus, and, when triggering reserved PUSCH resources for a plurality of mobile terminal apparatuses in the same subframe, triggers different reserved PUSCH resources between the terminals, from a plurality of reserved PUSCH resources.

The base station (for example, an S-cell) transmits a downlink scheduling assignment in a PDCCH or an E-PDCCH, in a subframe to transmit a PDSCH to a mobile terminal apparatus. When requesting a CQI report, the base station sets the index numbers that correspond to the reserved PUSCH resources for UCI transmission, in the downlink scheduling assignment. The base station transmits the downlink scheduling assignment, in which the index numbers to correspond to the reserved PUSCH resources are set, to the mobile terminal apparatus via the PDCCH or the E-PDCCH. One of the reserved PUSCH resources is triggered by the triggering bits of the downlink scheduling assignment, and allocated to the uplink of the S-cell.

Here, the CQI report is an example of a channel quality report, and a CQI report is by no means limiting. For example, it is equally possible to trigger PUSCH resources dynamically or periodically by a downlink scheduling assignment, for a CSI (CQI, PMI, RI) report, which is one channel quality report. When a CSI (CQI, PMI, RI) report is triggered, ACK/NACK and the CSI report are transmitted using the same PUSCH resources. It is also possible to transmit CSI and ACK/NACK in the same subframe using the PUSCH triggered by a downlink scheduling assignment.

FIG. 4 shows specific examples of triggering bits that may be set in a downlink scheduling assignment. The triggering bits "01" designate the reserved PUSCH resources corresponding to the index number=PRB index 1, the triggering bits "10" designate the reserved PUSCH resources corresponding to the index number=PRB index 2, the triggering bits "11" designate the reserved PUSCH resources corresponding to the index number=PRB index 3, and the triggering bits "00" mean not triggering CQI. In the example shown in FIG. 3, the reserved PUSCH resources corresponding to the index number=PRB index 2 are selected as resources to be allocated to the uplink of the S-cell by a downlink scheduling assignment in which "10" are set as triggering bits. UCI is transmitted using PUSCH resources that are allocated dynamically in this way. When the number of triggering bits is made three bits or more, it is possible to select four or more PUSCH resources per subframe dynamically.

The mobile terminal apparatus triggers one of the reserved PUSCH resources to be used to transmit UCI, with the triggering bits set in the downlink scheduling assignment received from the base station (for example, the S-cell) (FIG. 3(b)). The mobile terminal apparatus, for example, demodulates the PDSCH based on the downlink scheduling assignment included in a subframe received in the S-cell, generates ACK/NACK in response to the PDSCH, and measures CQI, which shows the downlink channel received quality in that subframe. Assuming that a downlink scheduling assignment to trigger a dynamic PUSCH resource is detected in a given subframe (for example, the n-th subframe), the mobile terminal apparatus transmits ACK/NACK and CQI to the base station (for example, an RRH) having transmitted that downlink scheduling assignment in the subframe that comes predetermined subframes later (for example, in the (n+4)-th subframe, which comes four subframes later), using the designated PUSCH resources (FIG. 3(c)). This drawing shows a situation where the PUSCH resource corresponding to PRB index 2 is selected dynamically by the triggering bits "10."

In this way, the PUSCH resources to use to transmit UCI are triggered dynamically with a downlink scheduling assignment and therefore are available for use even when there is no data traffic on the uplink. In the base station, CQI is used in downlink scheduling, and therefore triggering the PUSCH resources to use to transmit UCI when there is downlink data (PDSCH) suffices. Since there is always a PDSCH that is demodulated by a downlink scheduling assignment, it is possible to transmit CQI with ACK/NACK in response to that PDSCH, using dynamically triggered PUSCH resources. Although the PUSCH can also be triggered using an uplink scheduling grant, when there is no data traffic on the uplink, it is necessary to transmit an uplink scheduling grant for UCI transmission alone.

Also, since a plurality of PUSCH resources are secured temporarily in all subframes, it is possible to moderate the limit of subframes to use to transmit UCI. Furthermore, since the PUSCH resources to use to transmit UCI are only secured on a temporary basis, it is possible to use the PUSCH resources that do not transmit UCI, among the temporarily secured PUSCH resources, to transmit uplink data.

The method of triggering PUSCH resources periodically and transmitting UCI will be described with reference to FIG. 5.

Figure 5:
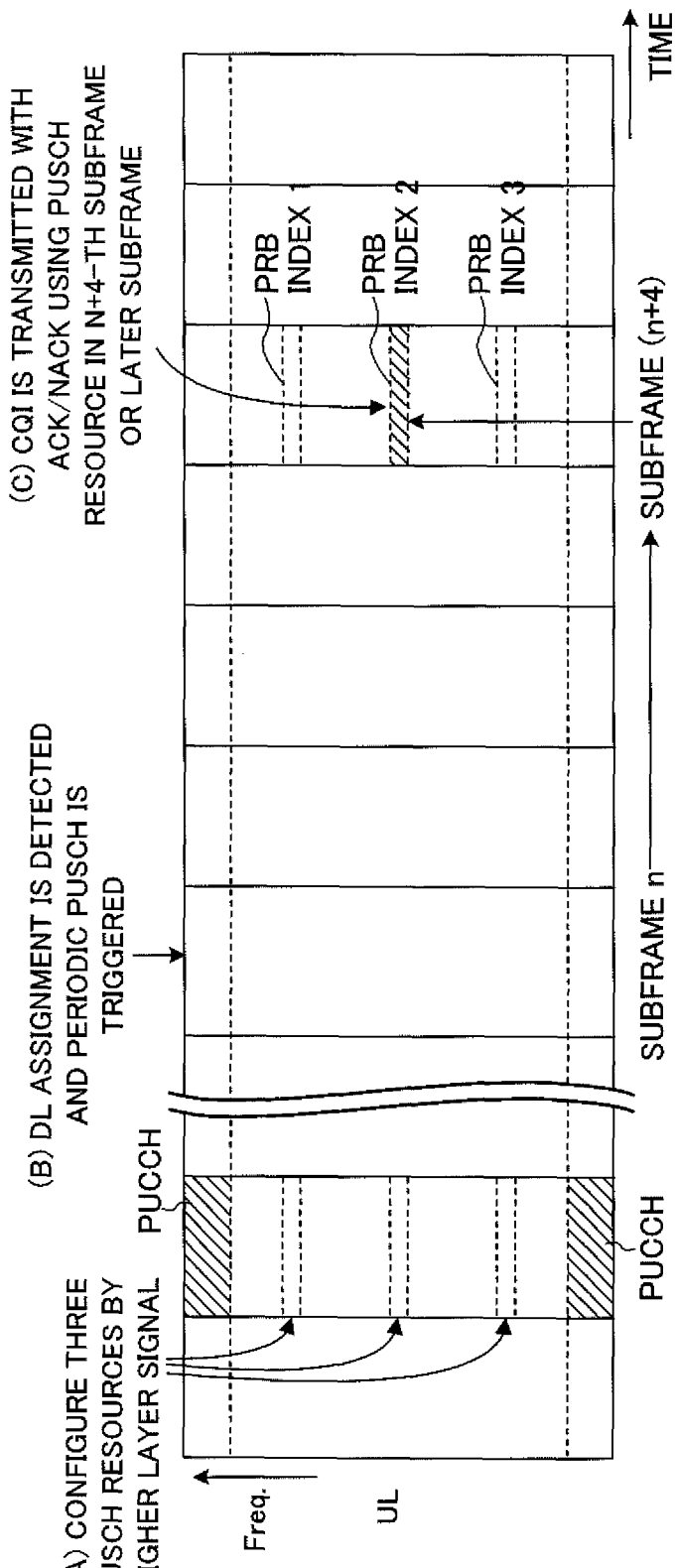
FIG. 5 is a configuration diagram of uplink subframes where periodic PUSCH resources are triggered.

FIG. 5 shows an example of a configuration of uplink subframes where PUSCH resources are triggered periodically. In the mobile terminal apparatus, PUSCH resources are reserved periodically (for example, at ten-subframe intervals). When UCI transmission occurs, one of the PUSCH resources that are reserved periodically is triggered, and UCI is transmitted using the triggered PUSCH resource.

Using higher layer signaling that is transmitted from the base station (for example, an S-cell), the mobile terminal apparatus reserves, periodically, a plurality of PUSCH resources at intervals of multiple subframes (FIG. 5(a)). FIG. 5 shows a situation where three PUSCH resources are periodically reserved for one subframe in the uplink resources. It is also possible to share periodic PUSCH resources (PRB index 1, PRB index 2 and PRB index 3) between a plurality of mobile terminal apparatuses. Since the base station knows the PUSCH resources that are reserved periodically, when triggering periodic PUSCH resources for a plurality of mobile terminal apparatuses in the same subframe, the base station designates, for the plurality of mobile terminal apparatuses, different periodic PUSCH resources between the terminals.

The base station (for example, the S-cell) transmits a downlink scheduling assignment by a PDCCH or an E-PDCCH in the subframe to transmit the PDSCH, to a mobile terminal apparatus. In this downlink scheduling assignment, the index numbers to correspond to periodic PUSCH resources, the subframe numbers to trigger periodic PUSCH resources, and the repetition cycle of periodic PUSCH resources in the time direction are set. The base station transmits the downlink scheduling assignment, in which the index numbers, the subframe numbers, and the repetition cycle to correspond to the periodic PUSCH resources are set, to the mobile terminal apparatus, via the PDCCH or the E-PDCCH. It is equally possible to report one of the subframe numbers and the repetition cycle.

The mobile terminal apparatus triggers the periodic PUSCH resource to use to transmit UCI with the triggering bits that are set in the downlink scheduling assignment (FIG. 5(b)). The mobile terminal apparatus, for example, demodulates the PDSCH based on the downlink scheduling assignment included in a given subframe of the S-cell, generates ACK/NACK in response to the PDSCH, and measures CQI to show the downlink channel received quality in that subframe. The mobile terminal apparatus reserves periodic PUSCH resources based on the index numbers, the subframe numbers and the repetition cycle included in the downlink scheduling assignment (for example, at ten-subframe intervals). When a downlink scheduling assignment is detected in a given subframe (for example, the n-th subframe), the mobile terminal apparatus transmits ACK/NACK and CQI to the base station (for example, an RRH) having transmitted that downlink scheduling assignment, in the first subframe in which periodic PUSCH resources are reserved and which comes predetermined subframes (for example, four subframes) later, using the periodic PUSCH resources (FIG. 5(c)).

Figure 6A:
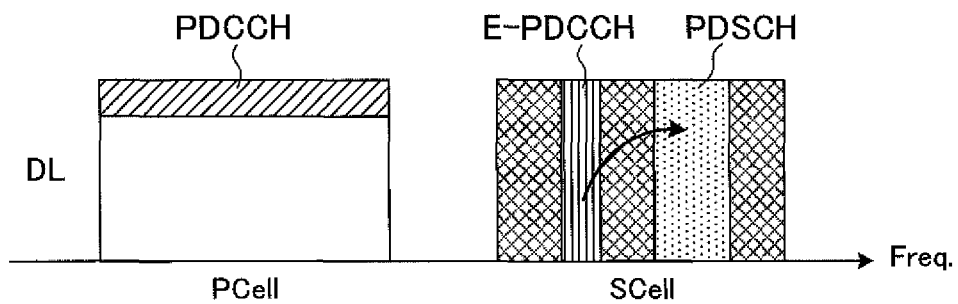
FIG. 6 provides configuration diagrams of downlink and uplink carriers in carrier aggregation of an additional carrier type.
Figure 6A:
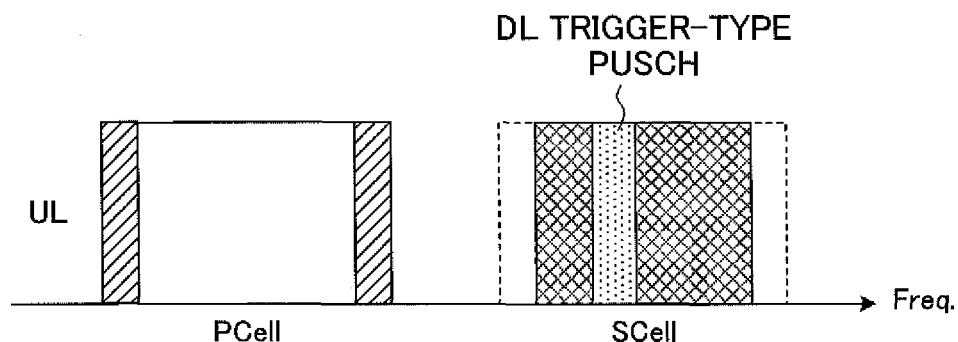

FIG. 6A shows a P-cell where a legacy carrier type (Rel-8) is applied and an S-cell where an additional carrier type is applied. When an additional carrier type is applied to an S-cell, an E-PDCCH and a PDSCH that is demodulated based on that E-PDCCH are transmitted from an RRH, on the downlink of the S-cell. When the RRH triggers dynamic or periodic PUSCH resources for transmitting CQI to a mobile terminal apparatus, triggering bits to show the index numbers of the PUSCH resources to be triggered are set in the downlink scheduling assignment included in the E-PDCCH. The mobile terminal apparatus receives the downlink signal of the S-cell, demodulates the E-PDCCH included in the downlink signal and detects the downlink scheduling assignment. The mobile terminal apparatus demodulates the PDSCH based on the downlink scheduling assignment, and generates ACK/NACK in response to the PDSCH. Also, if a CQI report is triggered by the downlink scheduling assignment, the mobile terminal apparatus measures the CQI of the downlink signal in the additional carrier type in predetermined frequency units. At this time, when triggering bits are set in the downlink scheduling assignment, the dynamic or periodic PUSCH resources of the PRB indices designated by the triggering bits are triggered. The CQI and ACK/NACK are transmitted using the triggered dynamic or periodic PUSCH resources on the uplink of the S-cell.

Also, when a legacy carrier type (Rel-8) is applied to the S-cell, triggering bits to represent the index numbers of dynamic or periodic PUSCH resources are set in the downlink scheduling assignment included in the PDCCH. The mobile terminal apparatus receives the downlink signal of the S-cell and demodulates the PDCCH, and, if triggering bits are set in the downlink scheduling assignment, triggers the dynamic or periodic PUSCH resources of the PRB indices designated by the triggering bits (allocation of the PUSCH resources corresponding to the PRB indices).

Now, the above dynamic or periodic PUSCH resources may be set only in one of the S-cell and the P-cell or may be set in both of the S-cell and the P-cell. In a HetNet, the P-cell primarily carries out the functions for securing coverage, while an S-cell is expected to achieve high transmission rates in local spots where traffic is heavy. Consequently, in the situation where an S-cell is added, UCI information such as ACK/NACK is expected to increase. As a result, in the situation where an S-cell is added in a HetNet, it is preferable to set dynamic or periodic PUSCH resources for the S-cell, from the perspective of reducing the frequency CQIs drop. Also, since the conventional PUCCH formats for carrier aggregation do not support simultaneous transmission of ACK/NACK and CQI, the frequency CQIs drop can be reduced by setting dynamic or periodic PUSCH resources in the P-cell as is the case with the conventional PUCCH.

When dynamic or periodic PUSCH resources are reserved on the uplink of an S-cell, it may be possible to signal resource information of the dynamic or periodic PUSCH resources to reserve, to a mobile terminal apparatus, with higher layer signaling to request addition of the S-cell. If communication by the P-cell is established in advance between the base station and the mobile terminal apparatus and the quality of the S-cell reported later from the mobile terminal apparatus surpasses a threshold value, the S-cell is added to the mobile terminal apparatus by the higher layer signal. At this time, resource information of the dynamic or periodic PUSCH resources (part or all of the PRB indices, the subframe numbers and the cycle) is included in the higher layer signal to request addition of the S-cell to the mobile terminal apparatus.

When dynamic or periodic PUSCH resources are set in both the S-cell and the P-cell, the S-cell and the P-cell may use separate resources (for example, different PRB indices), or may use common resources (for example, PRBs #0 to 49 for both of the P-cell and the S-cell) if the system bandwidth is the same between the P-cell and the S-cell (for example, the number of RBs is the same between the P-cell and the S-cell—for example, 50 RBs). The mobile terminal apparatus secures dynamic or periodic PUSCH resources on the uplinks of the P-cell and the S-cell, transmits UCI such as ACK/NACK and CQI in response to the PDSCH received in the P-cell, using the dynamic or periodic PUSCH resources or PUCCH resources triggered by the P-cell, and transmits UCI such as ACK/NACK and CQI in response to the PDSCH received in the S-cell, using the dynamic or periodic PUSCH resources triggered by the S-cell.

Also, if CQI is not triggered and ACK/NACK alone is transmitted on the uplink, the situation might occur where there is no PUSCH to be triggered by an uplink scheduling grant. In this case, it is possible to use the above dynamic or periodic PUSCH resources as resources to transmit ACK/NACK alone on the uplink. For example, when CQI is not triggered, a downlink scheduling assignment to trigger dynamic or periodic PUSCH resources is transmitted to a mobile terminal apparatus via the PDCCH or the E-PDCCH of the S-cell. By this means, the mobile terminal apparatus is able to transmit ACK/NACK using the dynamic or periodic PUSCH resources triggered by the S-cell.

Figure 6B:
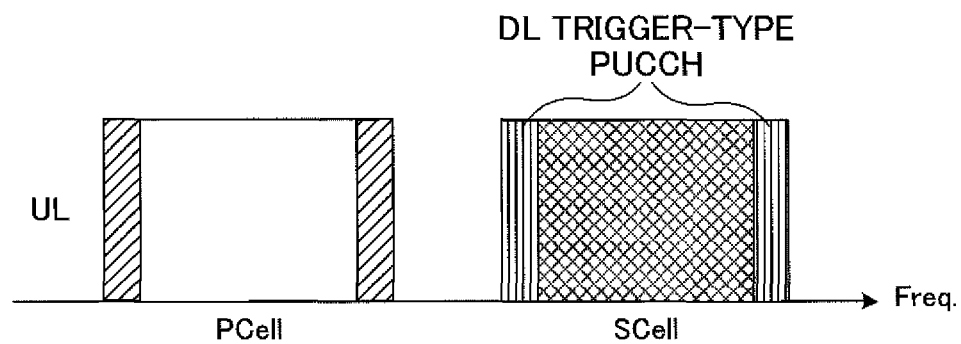

Also, it is equally possible to use the PUCCH of the P-cell or the PUCCH of the S-cell as the resource to transmit ACK/NACK alone on the uplink (FIG. 6B). When the PDSCH is transmitted only from the downlink of the S-cell, if the PUCCH is defined in the S-cell, it is possible to use this, and, if no PUCCH is defined, use the P-cell. When CQI is not triggered, whether ACK/NACK is transmitted using the PUCCH in this way or using dynamic or periodic PUSCH resources needs to be stipulated in the specifications.

When the PDSCH is transmitted only from the downlink of the P-cell, the PUCCH (format 1a/1b) is transmitted from the uplink of the P-cell. ACK/NACK is transmitted using the PUCCH (format 1a/1b) of the P-cell.

Also, when the PDSCH is transmitted only from the downlink of the S-cell, the PUCCH (format 1a/1b) is transmitted from the uplink of the S-cell. ACK/NACK is transmitted using the PUCCH (format 1a/1b) of the S-cell.

Also, when the PDSCH is transmitted from both the P-cell and the S-cell on the downlink, UCI is transmitted from one of the uplink P-cell and the uplink S-cell using a carrier aggregation PUCCH format. Which cell is used is reported to the mobile terminal apparatus by higher layer signaling.

In this way, it is possible to terminate simultaneous transmission of UCI by always transmitting UCI from only one cell.

The priority of the UCI transmission channel in the event there is not sufficient capacity to transmit the PUCCH and the PUSCH simultaneously will be described.

Figure 7A:
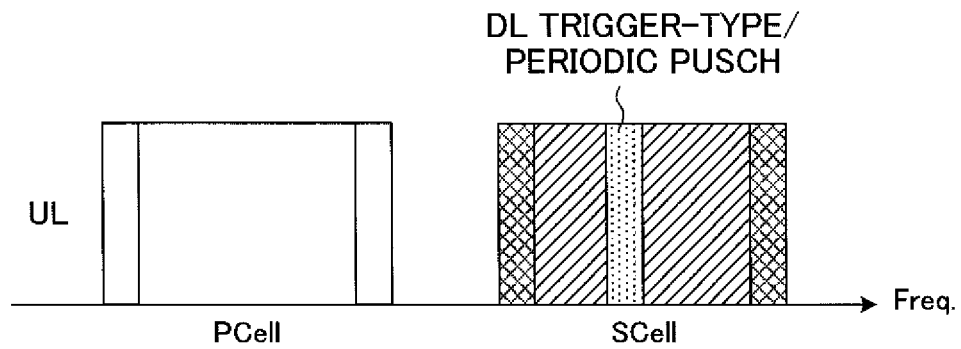
FIG. 7 provides configuration diagrams of carriers where a PUSCH is triggered by an S-cell and/or a P-cell.

As shown in FIG. 7A, when a PUCCH is set on the uplink of the P-cell and a dynamic or periodic PUSCH is set on the uplink of the S-cell, UCI of the P-cell and the S-cell is transmitted using the dynamic or periodic PUSCH of the S-cell preferentially. This is because PUSCH resources can transmit more bit data than PUCCH resources. Preferential use of the dynamic or periodic PUSCH of the S-cell needs to be stipulated in advance in the specifications. In Rel-10, the cell number of the P-cell is "0," and the cell number of the S-cell grows in order such as "1," "2," and on and on.

Also, the priority of the UCI transmission channel in the event there is sufficient capacity to transmit the PUCCH and the PUSCH simultaneously will be described.

Figure 7B:
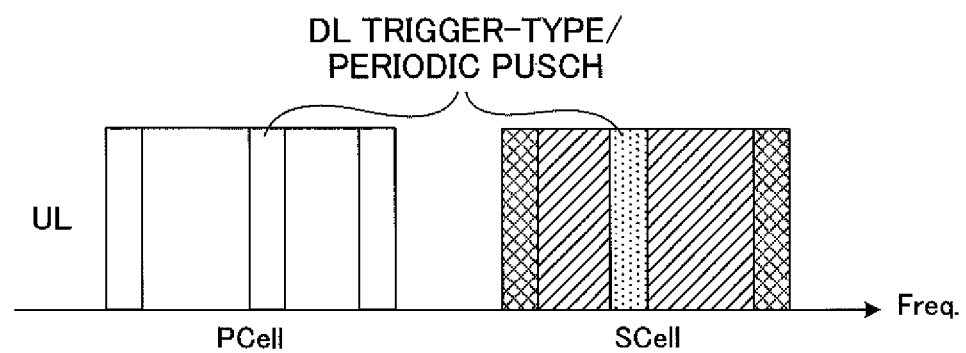

As shown in FIG. 7B, when a dynamic or periodic PUSCH is set on the uplink of the P-cell and a dynamic or periodic PUSCH is set on the uplink of the S-cell, the method to either (1) use the one having the smaller cell number, or (2) upon reporting the dynamic or periodic PUSCH to the mobile terminal apparatus by higher layer signaling, report the priority of the dynamic or periodic PUSCH of the S-cell together, may be possible. With the above method of (1), since the dynamic or periodic PUSCH of the P-cell has the highest priority, it is possible to gather the UCI transmission of the P-cell and the S-cell in the P-cell and relieve the load of simultaneous transmission. With the method of (2), it is possible to select priority in accordance with the environment upon setting the dynamic or periodic PUSCH, so that system design with high flexibility is made possible.

Next, a preferable way to deal with a case where a PUSCH is allocated in an uplink scheduling grant and a PDSCH is allocated in a downlink scheduling assignment in the same subframe will be described.

When a CQI report is not triggered in an uplink scheduling grant or in a downlink scheduling assignment, ACK/NACK is transmitted using the PUSCH triggered by the uplink scheduling grant.

When a CQI report is triggered in an uplink scheduling grant but is not triggered in a downlink scheduling assignment, UCI (ACK/NACK+CQI) is transmitted using the PUSCH triggered in accordance with the uplink scheduling grant.

When there is allocation to a PUSCH by an uplink scheduling grant, that PUSCH is transmitted using PRBs of good channel quality, based on scheduling, so that transmission using that PUSCH is preferable.

When a CQI report is not triggered in an uplink scheduling grant but is triggered in a downlink scheduling assignment, this is processed as a configuration error. Also, when a CQI report is triggered in both an uplink scheduling grant and a downlink scheduling assignment, this is also processed as a configuration error.

This is because if a CQI report triggered by a downlink scheduling assignment is allowed when there is allocation to a PUSCH by an uplink scheduling grant, it is necessary to transmit a PUSCH for the CQI report in addition to the transmission of the PUSCH triggered in the uplink scheduling grant, and the problem that two PUSCHs (multi-carrier transmissions) need to be transmitted in the same subframe arises. On the uplink, single-carrier transmission is preferable from the perspective of peak power, and the above multi-carrier transmission is not preferable.

Figure 8:
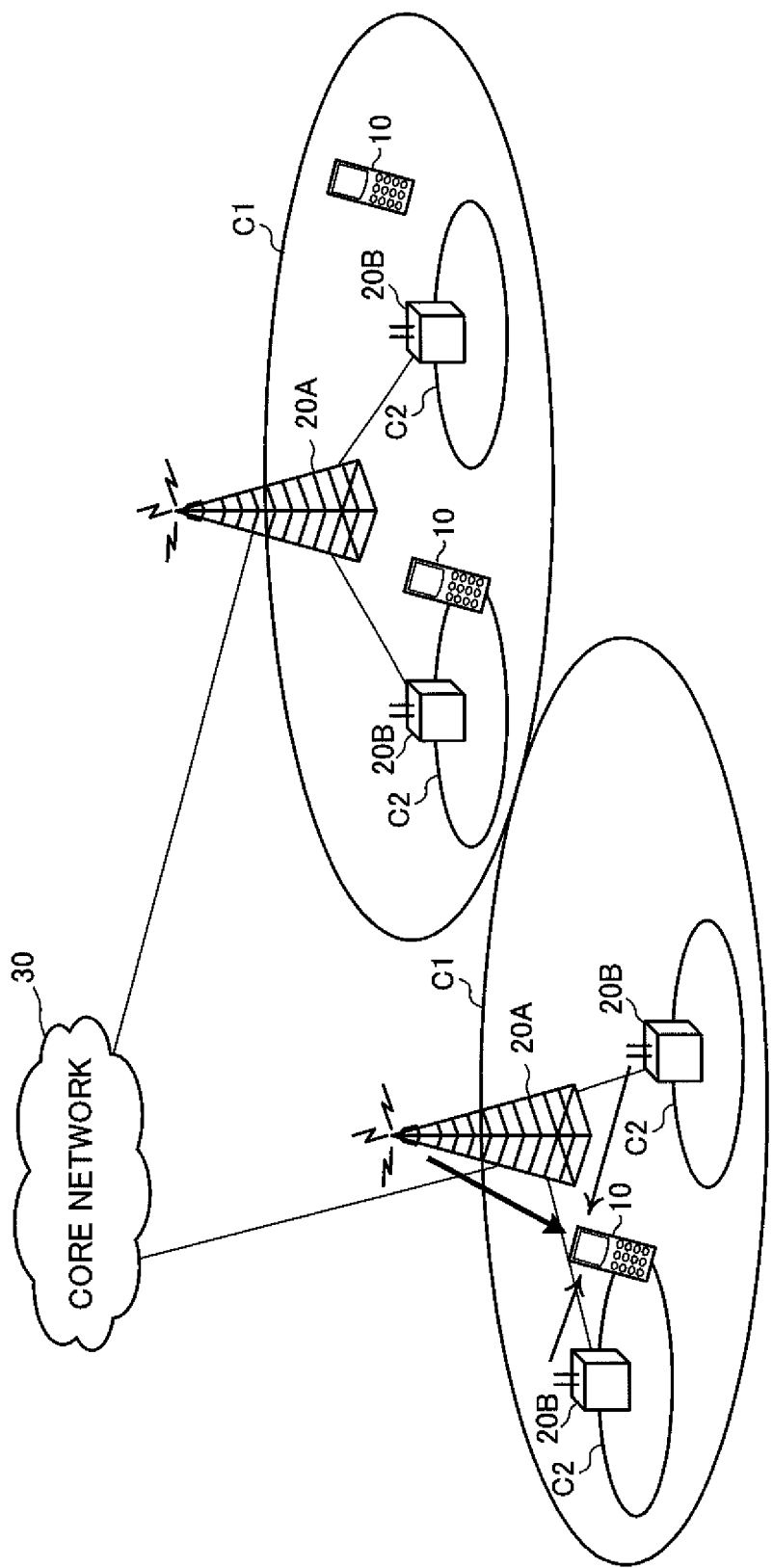
FIG. 8 is a diagram to explain a system configuration of a radio communication system.

Now, a radio communication system according to the present embodiment will be described in detail. FIG. 8 is a diagram to explain a system configuration of a radio communication system according to the present embodiment. Note that the radio communication system shown in FIG. 8 is a system to accommodate, for example, the LTE system or its successor system, and supports the above-described functions. In this radio communication system, carrier aggregation to make a plurality of fundamental frequency blocks as one, where the system band of the LTE system is one unit, is used. Also, this radio communication system may be referred to as "IMT-Advanced" or may be referred to as "4G."

As shown in FIG. 8, the radio communication system is a HetNet, where a base station apparatus (first base station apparatus) 20A of a cell C1, and a plurality of base station apparatuses (second base station apparatuses) 20B of cells C2 that are provided in cell C1 build a layered network. The base station apparatus 20A is commonly referred to as a macro base station apparatus, and covers large cell C1. The base station apparatuses 20B are commonly referred to as RRH base station apparatuses, and form small cells C2, locally, inside cell C1. The base station apparatus 20A and each base station apparatus 20B are connected with each other by wire connection or by wireless connection. The mobile terminal apparatuses 10 are able to communicate with the base station apparatuses 20A and 20B in cell C1 and cell C2, respectively. Also, the base station apparatus 20A is connected with a core network 30 via a higher station apparatus.

Note that the higher station apparatus may be, for example, an access gateway apparatus, a radio network controller (RNC), a mobility management entity (MME) and so on, but is by no means limited to these. Each mobile terminal apparatus 10 may be either a conventional mobile terminal apparatus (Rel-10 and earlier versions) or a new mobile terminal apparatus (Rel-11 and later versions), but the following description will be given primarily assuming a new mobile terminal apparatus (Rel-11 and later versions). Also, it is each mobile terminal apparatus 10 that will be described to perform radio communication with the base station apparatuses 20A and 20B for ease of explanation, more generally, user equipment (UE), which includes both mobile terminal apparatuses and fixed terminal apparatuses, may be used as well.

This radio communication system supports carrier aggregation suitable for a HetNet. In this case, a mobile terminal apparatus 10 receives downlink signals from each base station apparatus 20B while being connected with the base station apparatus 20A (P-cell). The mobile terminal apparatus 10 measures the signal quality from each base station apparatus 20B based on the downlink signals, and feeds back the measurement result to the base station apparatus 20A. Then, in accordance with the feedback from the mobile terminal apparatus 10, the base station apparatus 20A detects a base station apparatus 20B of good received quality as an S-cell, and executes carrier aggregation.

In the radio communication system, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels will be described. Downlink communication channels include a PDSCH that is used by each mobile terminal apparatus 10 on a shared basis, and downlink L1/L2 control channels (PDCCH, PCFICH, PHICH). User data and higher control information are transmitted by the PDSCH. PDSCH and PUSCH scheduling information and so on are transmitted by the PDCCH. The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator Channel).

Uplink communication channels include a PUSCH, which is used by each mobile terminal apparatus on a shared basis as an uplink data channel, and a PUCCH, which is an uplink control channel. User data and higher control information are transmitted by this PUSCH. Also, downlink CQI, ACK/NACK and so on are transmitted by the PUCCH.

Figure 9:
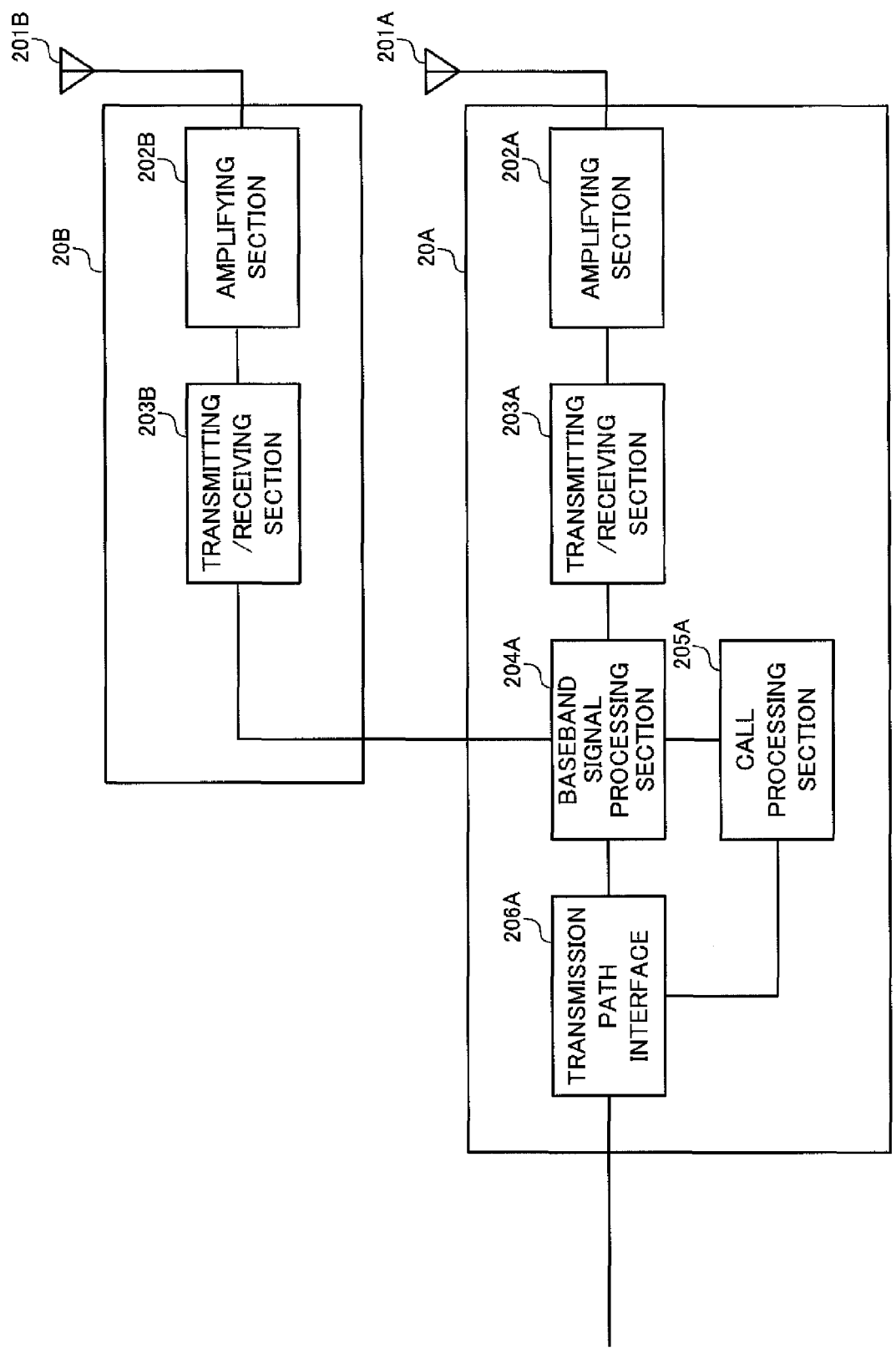
FIG. 9 is a diagram to explain an overall configuration of a base station apparatus.

An overall configuration of the base station apparatuses 20A and 20B according to the present embodiment will be described with reference to FIG. 9. Note that a baseband process is not executed in the base station apparatus 20B, and the base station apparatus 20B receives a baseband signal from the base station apparatus 20A and reports this to the mobile terminal apparatus 10.

The base station apparatus 20A has a transmitting/receiving antenna 201A, an amplifying section 202A, a transmitting/receiving section 203A, a baseband signal processing section 204A, a call processing section 205A, and a transmission path interface 206A. Also, the base station apparatus 20B has a transmitting/receiving antenna 201B, an amplifying section 202B, and a transmitting/receiving section 203B. Transmission data to be transmitted from the base station apparatuses 20A and 20B to the mobile terminal apparatus 10 on the downlink is input from the higher station apparatus into the baseband signal processing section 204A via the transmission path interface 206A.

In the baseband signal processing section 204A, a signal of a downlink data channel is subjected to a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, a signal of a downlink control channel is also subjected to transmission processes such as channel coding and an inverse fast Fourier transform.

Also, the baseband signal processing section 204A reports control information for allowing the mobile terminal apparatuses 10 to perform radio communication with the base station apparatuses 20A and 20B, to the mobile terminal apparatuses 10 connected to the same cell, by a broadcast channel. The information for communication in the cell includes, for example, the uplink or downlink system bandwidth, root sequence identification information (root sequence index) for generating random access preamble signals in the PRACH (Physical Random Access Channel), and so on.

In this case, a baseband signal to correspond to component carrier CC #1 of the P-cell is output from the baseband signal processing section 204A to the transmitting/receiving section 203A, and a baseband signal to correspond to component carrier CC #2 of the S-cell is output from the baseband signal processing section 204A to the transmitting/receiving section 203B of the base station apparatus 20B via optical fiber. The baseband signals that are output from the baseband signal processing section 204A are converted into a radio frequency band in the transmitting/receiving sections 203A and 203B. The amplifying sections 202A and 202B amplify the radio frequency signals having been subjected to frequency conversion, and transmit the results from the transmitting/receiving antennas 201A and 201B.

Meanwhile, as for data to be transmitted from the mobile terminal apparatus 10 to the base station apparatuses 20A and 20B on the uplink, radio frequency signals received in the transmitting/receiving antennas 201A and 201B of the base station apparatuses 20A and 20B are amplified in the amplifying sections 202A and 202B, converted into baseband signals through frequency conversion in the transmitting/receiving sections 203A and 203B and input in the baseband signal processing section 204A.

The baseband signal processing section 204A applies, to the transmission data included in the baseband signal received as input, an FFT process, an IDFT process, error correction decoding, a MAC retransmission control receiving process, and RLC layer and PDCP layer receiving processes. The baseband signals are transferred to the higher station apparatus via the transmission path interface 206A. The call processing section 205A performs call processing such as setting up and releasing communication channels, manages the state of the base station apparatuses 20A and 20B and manages the radio resources.

Figure 10:
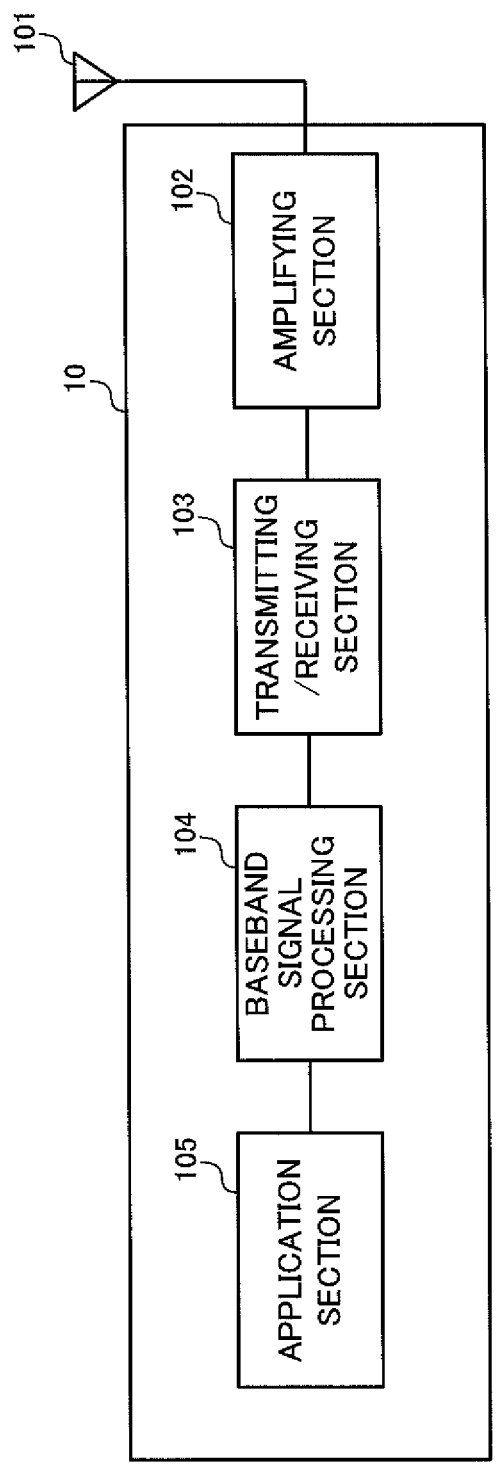
FIG. 10 is a diagram to explain an overall configuration of a mobile terminal apparatus.

Next, an overall configuration of a mobile terminal apparatus according to the present embodiment will be described with reference to FIG. 10. The mobile terminal apparatus 10 has a transmitting/receiving antenna 101, an amplifying section 102, a transmitting/receiving section 103 (receiving section), a baseband signal processing section 104, and an application section 105.

As for downlink data, a radio frequency signal that is received in the transmitting/receiving antenna 101 is amplified in the amplifying section 102, and subjected to frequency conversion and converted into a baseband signal in the transmitting/receiving section 103. This baseband signal is subjected to receiving processes such as an FFT process, error correction decoding and retransmission control, in the baseband signal processing section 104. In this downlink data, downlink user data is transferred to the application section 105. The application section 105 performs processes related to higher layers above the physical layer and the MAC layer. Also, in the downlink data, broadcast information is also transferred to the application section 105.

Meanwhile, uplink transmission data is input from the application section 105 to the baseband signal processing section 104. The baseband signal processing section 104 performs a mapping process, a retransmission control (H-ARQ) transmission process, channel coding, a DFT process, and an IFFT process. The baseband signal that is output from the baseband signal processing section 104 is converted into a radio frequency band in the transmitting/receiving section 103, and, after that, amplified in the amplifying section 102 and transmitted from the transmitting/receiving antenna 101.

Figure 11:
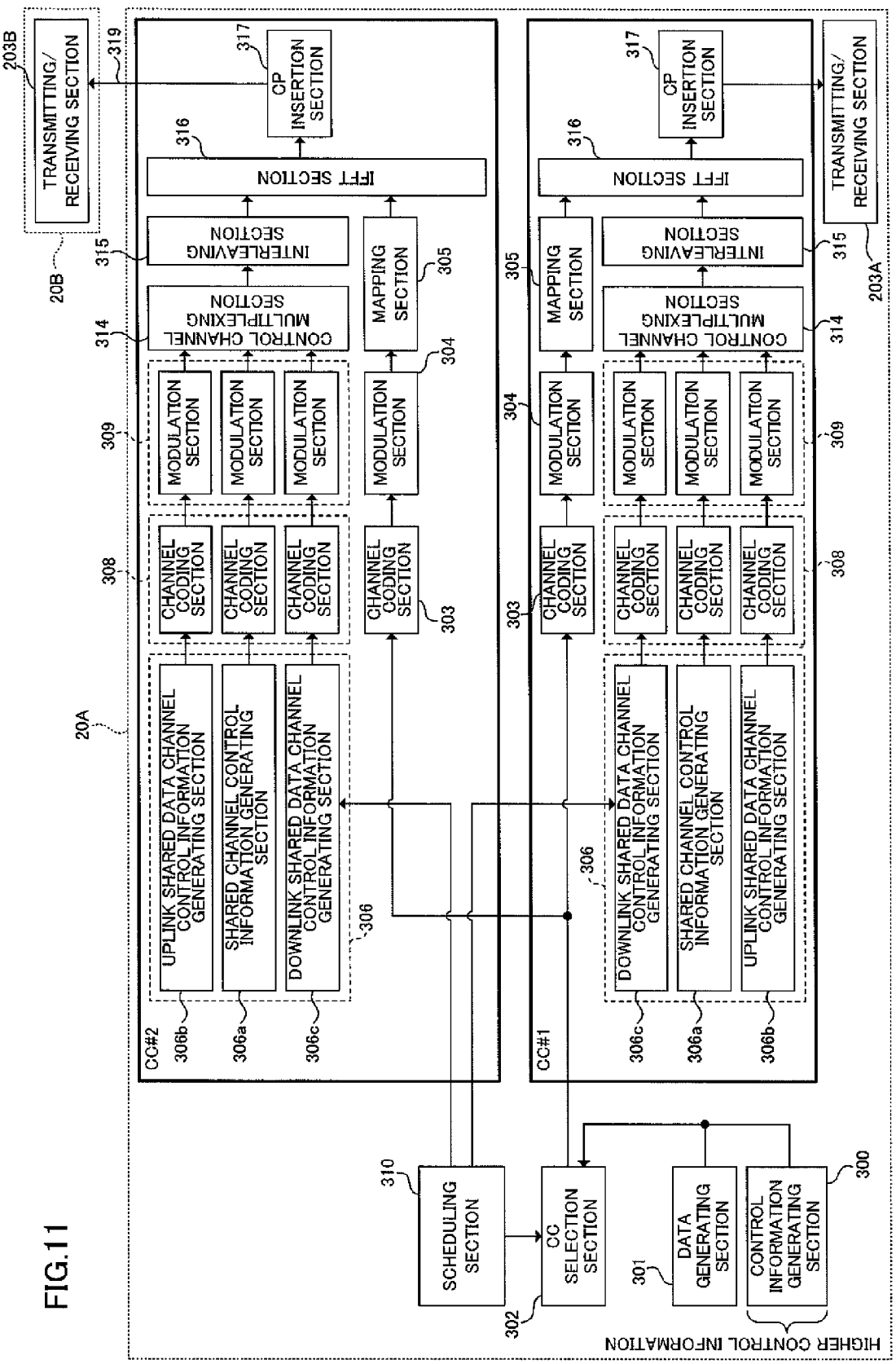
FIG. 11 is a functional block diagram of a baseband signal processing section provided in a base station apparatus and part of higher layers.

FIG. 11 is a functional block diagram of a baseband signal processing section 204A provided in the base station apparatus 20A according to the present embodiment and part of the higher layers, and primarily illustrates the function blocks for transmission processes in the baseband signal processing section 204A. Transmission data for the mobile terminal apparatus 10 under the base station apparatus 20A is transferred from the higher station apparatus to the base station apparatus 20A.

Note that, in FIG. 11, the base station apparatus 20A is shown as an example. Also, the base station apparatus 20A is shown to have a configuration to be able to support carrier aggregation of two component carriers CC #1 and CC #2. Obviously, the number of CCs each base station apparatus 20 uses is not limited to this. Also, assume that a legacy carrier type is set in component carrier CC #1 allocated to the base station apparatus 20A, and an additional carrier type is set in component carrier CC #2.

A control information generating section 300 generates, per user, higher control information to report to the mobile terminal apparatus 10 through higher layer signaling. The higher control information includes resource information for reserving dynamic or periodic PUSCHs on the uplink of component carriers CC #1 and CC #2 (for example, when reserving periodic PUSCHs, the PRB indices, the subframe numbers and the cycle).

A data generating section 301 outputs transmission data transferred from the higher station apparatus, as user data, on a per user basis. A component carrier selection section 302 selects, on a per mobile terminal apparatus 10 basis, the component carriers to use for radio communication with the mobile terminal apparatus 10. When carrier aggregation is performed, component carrier CC #1 of the base station apparatus 20A is the P-cell and an S-cell is selected from other base station apparatuses 20B via optical fiber 319. An increase/decrease of component carriers is reported from the base station apparatus 20A to the mobile terminal apparatus 10 by higher layer signaling, and a message of completion of application is received from the mobile terminal apparatus 10.

A scheduling section 310 controls the allocation of component carriers to a serving mobile terminal apparatus 10 according to the overall communication quality of the system band. The scheduling section 310 performs scheduling separately between LTE terminal users and LTE-A terminal users. The scheduling section 310 receives as input the data to transmit and retransmission commands from the higher station apparatus, and also receives as input channel estimation values and resource block CQIs from a receiving section having measured an uplink signal.

Also, the scheduling section 310 schedules downlink control channel signals and downlink shared channel signals with reference to the retransmission commands, the channel estimation values and the CQIs received as input. A propagation path in radio communication varies differently per frequency, due to frequency selective fading. So, the scheduling section 310 designates resource blocks (mapping positions) of good communication quality, on a per subframe basis, with respect to the downlink data for each mobile terminal apparatus 10 (which is referred to as "adaptive frequency scheduling"). In adaptive frequency scheduling, for each resource block, a mobile terminal apparatus 10 of good propagation path quality is selected. Consequently, the scheduling section 310 designates resource blocks (mapping positions), using the CQI of each resource block, fed back from each mobile terminal apparatus 10.

Likewise, the scheduling section 310 designates resource blocks of good communication quality, on a per subframe basis, with respect to the control information and so on to be transmitted by the PDCCH (or E-PDCCH), by adaptive frequency scheduling. Consequently, the scheduling section 310 designates resource blocks (mapping positions), using the CQI of each resource block, fed back from each mobile terminal apparatus 10. Also, the MCS (coding rate and modulation scheme) to fulfill a predetermined block error rate with the allocated resource blocks is determined. Parameters to fulfill the MCS (coding rate and modulation scheme) determined in the scheduling section 310 are set in channel coding sections 303 and 308, and modulation sections 304 and 309. Note that adaptive frequency scheduling is applied not only to the base station apparatus 20A but is also applied to the base station apparatuses 20B as well via the optical fiber 319.

Also, the baseband signal processing section 204A has channel coding sections 303, modulation sections 304 and mapping sections 305 to support the maximum number of users to multiplex, N, in one component carrier. The channel coding sections 303 perform channel coding of the downlink shared data channel (PDSCH), which is formed with downlink data (including part of higher control signals) that is output from the data generating section 301, on a per user basis. The modulation sections 304 modulate user data having been subjected to channel coding, on a per user basis. The mapping sections 305 map the modulated user data to radio resources.

Also, the baseband signal processing section 204A has a downlink control information generating section 306 that generates downlink control information, channel coding sections 308, and modulation sections 309. In the downlink control information generating section 306, an uplink shared data channel control information generating section 306b generates uplink scheduling grants (UL Grants) for controlling an uplink data channel (PUSCH). The uplink scheduling grants are generated on a per user basis.

Also, a downlink shared data channel control information generating section 306c generates downlink scheduling assignments (DL assignments) for controlling a downlink data channel (PDSCH). The downlink scheduling assignments are generated on a per user basis. The baseband signal processing section 204A (CC #2) for the base station apparatus 20B sets triggering bits based on FIG. 4 in a downlink scheduling assignment when triggering a dynamic or periodic PUSCH in the S-cell. The triggering bits are set in the downlink scheduling assignment at the time of triggering a CQI report for the mobile terminal apparatus 10. For example, as shown in FIG. 3, when transmitting UCI using the PUSCH resources corresponding to the PRB index 2, "10" are set as triggering bits. When a dynamic or periodic PUSCH to be used to transmit UCI is not triggered, "00" are set as triggering bits. Also, when a dynamic or periodic PUSCH is triggered in the P-cell, triggering bits are set in the downlink scheduling assignment based on FIG. 4. The triggering bits are set in the downlink scheduling assignment at the time to trigger a CQI report for the mobile terminal apparatus 10. For example, as shown in FIG. 3, when UCI is transmitted using the PUSCH resources corresponding to the PRB index 2, "10" are set as triggering bits. When a dynamic or periodic PUSCH to use for CIU transmission is not triggered, "00" are set as triggering bits. Also, a shared channel control information generating section 306a generates shared control channel control information, which is downlink control information that is common between users.

Control information that is modulated in modulation sections 309 on a per user basis is multiplexed in a control channel multiplexing section 314 and furthermore interleaved in an interleaving section 315. A control signal that is output from the interleaving section 315 and user data that is output from the mapping sections 305 are input in an IFFT section 316 as downlink channel signals.

The IFFT section 316 receives as input the control signal from the interleaving section 315, and receives as input the user data from the mapping sections 305 as downlink channel signals. Also, the IFFT section 316 further receives as input downlink reference signals. For the downlink reference signals, CRSs for channel estimation, DM-RSs for downlink demodulation, CSI-RSs for CSI measurement and so on may be generated. The IFFT section 316 performs an inverse fast Fourier transform of the downlink channel signals and downlink reference signals and converts the frequency domain signals into time sequence signals. A cyclic prefix inserting section 317 inserts cyclic prefixes in the time sequence signals of the downlink channel signals. Note that a cyclic prefix functions as a guard interval for cancelling the differences in multipath propagation delay. Transmission data, to which cyclic prefixes have been added, is transmitted to the transmitting/receiving sections 203A and 203B.

Note that, in component carrier CC #2, all the subframes may be set in an additional carrier type, or predetermined subframes may be set in an additional carrier type and the rest of the subframes may be set in a legacy carrier type. In this case, it is possible to connect not only new mobile terminal apparatuses (Rel-11 and later versions) to component carrier CC #2 to be allocated to the base station apparatus 20B, but it is also possible to connect conventional mobile terminal apparatuses (Rel-10 and earlier versions) in the legacy carrier type period.

Figure 12:
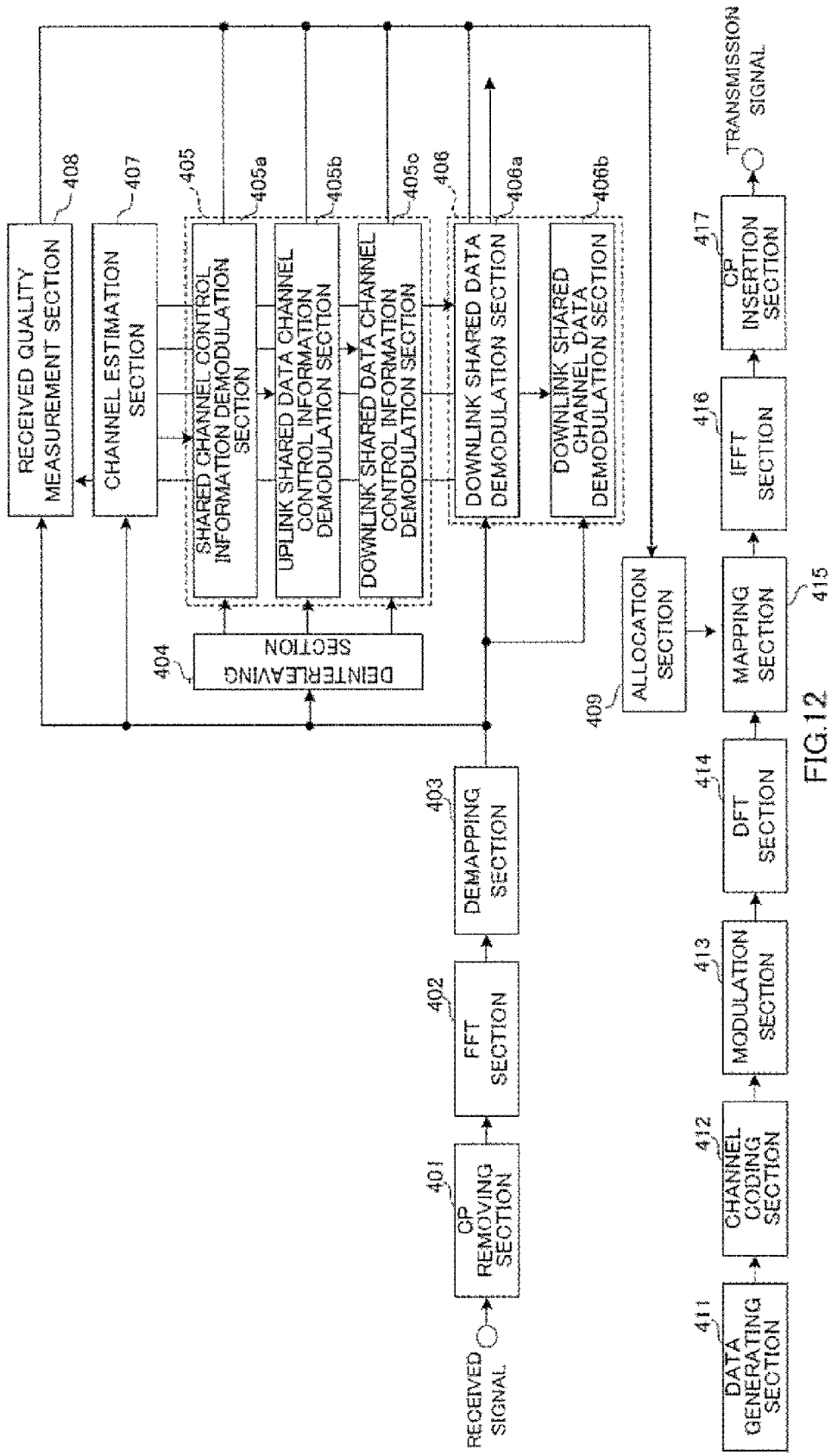
FIG. 12 is a functional block diagram of a baseband signal processing section provided in a mobile terminal apparatus.

FIG. 12 shows a functional block diagram of the baseband signal processing section 104 provided in the mobile terminal apparatus 10, and shows the function blocks of an LTE-A terminal that supports the additional carrier type.

Downlink signals that are received as received data from the base station apparatuses 20A and 20B have the CPs removed in the CP removing section 401. The downlink signals, from which the CPs have been removed, are input in an FFT section 402. The FFT section 402 performs a fast Fourier transform (FFT) on the downlink signals, converts the time domain signals into frequency domain signals and inputs the signals in a demapping section 403. The demapping section 403 demaps the downlink signals, and extracts, from the downlink signals, multiplex control information in which a plurality of pieces of control information are multiplexed, user data and higher control signals. Note that the demapping process by the demapping section 403 is performed based on higher control signals that are received as input from the application section 105. The multiplex control information that is output from the demapping section 403 is deinterleaved in a deinterleaving section 404.

Also, the baseband signal processing section 104 has a downlink control information demodulation section 405 that demodulates downlink control information, a data demodulation section 406 that demodulates downlink shared data, a channel estimation section 407, a received quality measurement section (measurement section) 408, and an allocation section 409. Note that the allocation section 409 may assume a configuration not to be included in the baseband signal processing section 104, as described later. Also, the downlink control information demodulation section 405 includes a shared channel control information demodulation section 405a that demodulates shared control channel control information from the multiplex control information, an uplink shared data channel control information demodulation section 405b that demodulates uplink shared data channel control information from the multiplex control information, and a downlink shared data channel control information demodulation section 405c that demodulates downlink shared data channel control information from the multiplex control information.

The shared channel control information demodulation section 405a extracts shared control channel control information, which is control information that is common between users, by, for example, performing a blind decoding process of the common search space in the downlink control channel (PDCCH), a demodulation process, and a channel decoding process and so on. The shared control channel control information includes downlink channel quality information (CQI), and therefore is input in a mapping section 415 and mapped as part of transmission data for the base station apparatus 20.

The uplink shared data channel control information demodulation section 405b extracts uplink shared data channel control information (for example, UL grants), by, for example, performing a blind decoding process of the user-specific search spaces of the downlink control channel (PDCCH), a demodulation process, and a channel decoding process and so on. The demodulated uplink shared data channel control information is input in the mapping section 415 and is used to control the uplink shared data channel (PUSCH).

The downlink shared data channel control information demodulation section 405c extracts user-specific downlink shared data channel control information (for example, downlink scheduling assignments) by performing a blind decoding process of the user-specific search spaces of the downlink control channel (PDCCH), a demodulation process, a channel decoding process and so on. PUSCH triggering bits are set in the downlink scheduling assignment. The demodulated downlink shared data channel control information is input in the data demodulation section 406 and used to control the downlink shared data channel (PDSCH).

The data demodulation section 406 has a downlink shared data demodulation section 406a that demodulates user data and higher control signals, and a downlink shared channel data demodulation section 406b that demodulates downlink shared channel data.

The downlink shared data demodulation section 406a acquires user data and higher control information based on downlink shared data channel control information that is input from the downlink shared data channel control information demodulation section 405c. In response to a request to add an S-cell included in the higher control information, an S-cell of an additional carrier type is added. At this time, if resource information of dynamic or periodic PUSCH resources is included in the higher control information, the dynamic or periodic PUSCH resources are reserved in accordance with the resource information. In the example shown in FIG. 4, the PUSCH resources of the PRB indices 1, 2 and 3 are reserved.

The downlink shared channel data demodulation section 406b demodulates downlink shared channel data based on the uplink shared data channel control information that is input from the uplink shared data channel control information demodulation section 405b. In this case, the data demodulation section 406 performs derate matching by switching the rate matching pattern depending on the carrier type of the component carriers. For example, with the component carriers of the additional carrier type, the demodulation process is performed adequately taking into account the user data allocated to the CRS and the PDCCH resources.

The channel estimation section 407 performs channel estimation using user-specific reference signals (DM-RSs) or cell-specific reference signals (CRSs). When subframes of the legacy carrier type are demodulated, channel estimation is performed using CRSs or DM-RSs. When subframes of the additional carrier type are demodulated, channel estimation is carried out using DM-RSs, if part or all of the CRSs are reduced. The channel estimation section 407 outputs the estimated channel variation to the shared channel control information demodulation section 405a, the uplink shared data channel control information demodulation section 405b, the downlink shared data channel control information demodulation section 405c and the downlink shared data demodulation section 406a. In these demodulation sections, the demodulation process is performed using the estimated channel variation and reference signals for demodulation.

The received quality measurement section 408 measures CQI, which is an indicator to show downlink channel received quality. The received quality measurement section 408 outputs the received quality measurement result to the mapping section 415, and sends feedback to the base station apparatus 20A. The received quality measurement result may be fed back straight from the mobile terminal apparatus 10 to the base station apparatus 20A, or may be fed back from the mobile terminal apparatus 10 to the base station apparatus 20A via the base station apparatus 20B.

The allocation section 409 determines the PUSCH resource to reserve in the S-cell based on the higher layer signaling demodulated by the downlink shared data demodulation section 406a. A plurality of PUSCH resources can be reserved for every subframe by higher layer signaling (see FIG. 3). Also, depending on higher layer signaling, it is also possible to reserve a plurality of PUSCH resources at intervals of multiple subframes (see FIG. 5). The allocation section 409 triggers the PUSCH resources that are designated out of the reserved PUSCH resources, based on the triggering bits (see FIG. 4) included in the downlink scheduling assignment demodulated by the downlink shared data channel control information demodulation section 405c. That is, the PUSCH resources to be specified by the triggering bits included in the downlink scheduling assignment are allocated to, for example, the S-cell. In accordance with the uplink resource control by the allocation section 409, ACK/NACK and CQI report are transmitted together to the base station (RRH), using the PUSCH resources triggered by the uplink of the S-cell.

Here, when a PUSCH is allocated in an uplink scheduling grant and a PDSCH is allocated in a downlink scheduling assignment in the same subframe, the allocation section 409 deals with this as follows.

When a CQI report is not triggered in the uplink scheduling grant or in the downlink scheduling assignment, ACK/NACK is transmitted using the PUSCH triggered by the uplink scheduling grant.

When a CQI report is triggered in the uplink scheduling grant but is not triggered in the downlink scheduling assignment, UCI (ACK/NACK+CQI) is transmitted using the PUSCH triggered in accordance with the uplink scheduling grant.

Meanwhile, when a CQI report is not triggered in the uplink scheduling grant but is triggered in the downlink scheduling assignment, and when a CQI report is triggered in both the uplink scheduling grant and the downlink scheduling assignment, this is dealt with as a configuration error.

Also, when a CQI report is not triggered by the downlink scheduling assignment and a PUSCH is not allocated to the S-cell by the uplink scheduling grant, the allocation section 409 is able to transmit ACK/NACK for the PDSCH allocated by the downlink scheduling assignment, using one of the reserved PUSCH resources from the S-cell.

Also, when simultaneous transmission of the uplinks of the P-cell and the S-cell is allowed, the allocation section 409 transmits the ACK/NACK and/or CQI report for the PDSCH received in the P-cell, in predetermined subframes, using the PUSCH or PUCCH allocated to the uplink of the P-cell. Also, it is equally possible to transmit the ACK/NACK and CQI report for the PDSCH received in the S-cell in the same subframe as the P-cell using the PUSCH allocated to the uplink of the S-cell.

Also, when simultaneous transmission of the uplinks of the P-cell and the S-cell is not allowed, the allocation section 409 preferably prioritizes the transmission of the ACK/NACK and CQI report by the PDSCH allocated to the uplink of the S-cell, over the transmission of UCI by the PUSCH allocated to the uplink of the P-cell.

Also, when simultaneous uplink transmission by the P-cell and S-cell is not allowed, the allocation section 409 prioritizes the carrier of the smallest cell number between two carriers for the UCI transmission by the PUSCH allocated to the uplink of the P-cell and the UCI transmission by the PUSCH allocated to the uplink of the S-cell.

Also, the allocation section 409 may have the priority of the S-cell to apply when the time to transmit uplink control information overlaps between the P-cell and the S-cell reported in advance by higher layer signaling.

Also, the baseband signal processing section 104 has, as function blocks of the transmission processing system, a data generating section 411, a channel coding section 412, a modulation section 413, a DFT section 414, a mapping section 415, an IFFT section 416, and an CP inserting section 417. The data generating section 411 generates transmission data from bit data that is received as input from the application section 105. The channel coding section 412 applies channel coding processes such as error correction to the transmission data, and the modulation section 413 modulates the transmission data after the channel coding by QPSK and so on.

The DFT section 414 performs a discrete Fourier transform on the modulated transmission data. The mapping section 415 maps the frequency components of the data symbols after the DFT to subcarrier positions designated by the base station apparatuses 20A and 20B. The IFFT section 416 converts the input data, which corresponds to the system band, into time sequence data, by performing an inverse fast Fourier transform, and the CP inserting section 417 inserts cyclic prefixes in the time sequence data in data units.

The mobile terminal apparatus 10 configured in this way is able to reserve PUSCH resources per uplink subframe of the S-cell or in a predetermined cycle by higher layer signaling, trigger arbitrary reserved PUSCH resources by triggering bits included in a downlink scheduling assignment, and transmit a CQI report with ACK/NACK using the PUSCH resources.

As described above, with the communication system according to the present embodiment, it is possible to trigger arbitrary reserved PUSCH resources by a downlink scheduling assignment and allocate resources to the uplink, so that it is possible to build a system that can reduce the frequency CQIs drop upon carrier aggregation in a HetNet, and transmit UCI with high efficiency.

The present invention is by no means limited to the above embodiment and can be implemented in various modifications. For example, without departing from the scope of the present invention, it is possible to adequately change the number of carriers, the bandwidth of carriers, the signaling method, the types of additional carrier types, the number of processing sections, and the order of processing steps in the above description, and implement the present invention. Besides, the present invention can be implemented with various changes, without departing from the scope of the present invention.

The disclosure of Japanese Patent Application No. 2012-062689, filed on Mar. 19, 2012, including the specification, drawings and abstract, is incorporated herein by reference in its entirety.

The invention claimed is:

1. A communication system to control a plurality of carriers, the communication system comprising:
 a mobile terminal apparatus, a first base station apparatus, and a second base station apparatus;
 wherein the mobile terminal apparatus communicates with the first base station apparatus using a first carrier and communicates with the second base station apparatus using a second carrier, which is different from the first carrier,
 the second base station apparatus comprises:
  a higher control information generating section that generates higher layer signaling for allowing the mobile terminal apparatus to reserve a physical uplink shared channel resource of the second carrier;
  a downlink control information generating section that generates a downlink scheduling assignment that includes a triggering bit for allocating the physical uplink shared channel resource that is reserved for the second carrier; and
  a transmission section of the second base station that signals the higher layer signal and the downlink scheduling assignment to the mobile terminal apparatus, and
 the mobile terminal apparatus comprises:
  a receiving section that receives a downlink signal from the first and second base station apparatuses;
  a data demodulation section that demodulates a data signal including higher layer signaling, included in the downlink signal;
  a control information demodulation section that demodulates a downlink control signal including the downlink scheduling assignment and an uplink scheduling grant, included in the downlink signal;
  an allocation section that reserves the physical uplink shared channel resource for the second carrier by the demodulated higher layer signal, and allocates the reserved physical uplink shared channel resource to the second carrier by the demodulated downlink scheduling assignment; and a transmission section of the mobile terminal that transmits a channel quality report triggered by the demodulated downlink scheduling assignment to the second base station apparatus using the physical uplink shared channel resource allocated to the second carrier, wherein, when simultaneous uplink transmission by the first carrier and the second carrier is not allowed, the mobile terminal apparatus prioritizes transmitting an ACK/NACK and the channel quality report by a physical uplink shared channel allocated to an uplink of the second carrier over transmitting the ACK/NACK and the channel quality report by a physical uplink control channel allocated to the uplink of the first carrier.

2. The communication system according to claim 1, wherein the transmission section of the mobile terminal apparatus transmits uplink control information including an ACK/NACK in response to the physical downlink shared data channel allocated by the downlink scheduling assignment and a CQI report as the channel quality report triggered by the downlink scheduling assignment, to the second base station apparatus, using the physical uplink shared channel resource allocated by the downlink scheduling assignment.

3. The communication system according to claim 1, wherein the an allocation section of the mobile terminal apparatus reserves a plurality of physical uplink shared channel resources per subframe by the higher layer signal.

4. The communication system according to claim 1, wherein the allocation section of the mobile terminal apparatus reserves a plurality of physical uplink shared channel resources at predetermined subframe intervals by the higher layer signal.

5. The communication system according to claim 1, wherein, when the channel quality report is not triggered by the downlink scheduling assignment and a physical uplink shared channel is not allocated to the second carrier by an uplink scheduling grant, the transmission section of the mobile terminal apparatus transmits an ACK/NACK for the physical downlink shared data channel allocated by the downlink scheduling assignment, from the second carrier to the second base station apparatus, using one of the reserved physical uplink shared channel resources.

6. The communication system according to claim 1, wherein, when simultaneous uplink transmission by the first carrier and the second carrier is allowed, the transmission section of the mobile terminal apparatus transmits an ACK/NACK and/or the channel quality report for the physical downlink shared data channel received on a downlink of the first carrier in a predetermined subframe using a physical uplink shared channel or a physical uplink control channel allocated to an uplink of the first carrier, and transmits the ACK/NACK and the channel quality report for the physical downlink shared data channel received on the downlink of the second carrier in a same subframe as the predetermined subframe of the first carrier using the physical uplink shared channel allocated to the uplink of the second carrier.

7. The communication system according to claim 1, wherein, when both an uplink scheduling grant and the downlink scheduling assignment are received on a downlink of the second carrier, if the channel quality report is not triggered by the uplink scheduling grant and the channel quality report is not triggered by the downlink scheduling assignment either, the transmission section of the mobile terminal apparatus transmits an ACK/NACK using a physical uplink shared channel allocated by the uplink scheduling grant.

8. The communication system according to claim 1, wherein, when both an uplink scheduling grant and the downlink scheduling assignment are received on a downlink of the second carrier, if the channel quality report is triggered by the uplink scheduling grant but the channel quality report is not triggered by the downlink scheduling assignment, the transmission section of the mobile terminal apparatus transmits an ACK/NACK and the channel quality report using a physical uplink shared channel allocated by the uplink scheduling grant.

9. The communication system according to claim 1, wherein, when both an uplink scheduling grant and the downlink scheduling assignment are received on a downlink of the second carrier, if the channel quality report is not triggered by the uplink scheduling grant but the channel quality report is triggered by the downlink scheduling assignment, the allocation section of the mobile terminal apparatus detects a configuration error and does not transmit an ACK/NACK and the channel quality report.

10. The communication system according to claim 1, wherein, when both an uplink scheduling grant and the downlink scheduling assignment are received on a downlink of the second carrier, if the channel quality report is triggered by the uplink scheduling grant and the channel quality report is triggered by the downlink scheduling assignment, the allocation section of the mobile terminal apparatus detects a configuration error and does not transmit an ACK/NACK and the channel quality report.

11. A base station apparatus in a communication system to control a plurality of carriers such that a mobile terminal apparatus communicates with a first transmission point using a first carrier and communicates with a second transmission point using a second carrier, which is different from the first carrier, the base station apparatus generating at least a downlink signal transmitted from the second transmission point, wherein the base station apparatus comprises:

a higher control information generating section that generates higher layer signaling for allowing the mobile terminal apparatus to reserve a physical uplink shared channel resource of the second carrier;

a downlink control information generating section that generates a down/ink scheduling assignment that includes a triggering bit for allocating the physical uplink shared channel resource that is reserved for the second carrier; and a transmission section that signals the higher layer signal and the downlink scheduling assignment to the mobile terminal apparatus, wherein, when simultaneous uplink transmission by the first carrier and the second carrier is not allowed, the mobile terminal apparatus prioritizes transmitting an ACK/NACK and the channel quality report by a physical uplink shared channel allocated to an uplink of the second carrier over transmitting the ACK/NACK and the channel quality report by a physical uplink control channel allocated to the uplink of the first carrier.

12. A mobile terminal apparatus that communicates with a first base station apparatus using a first carrier and communicates with a second base station apparatus using a second carrier, which is different from the first carrier, wherein the mobile terminal apparatus comprises:

a receiving section that receives a downlink signal from the first and second base station apparatuses;

a data demodulation section that demodulates a data signal including higher layer signaling, included in the downlink signal;
a control information demodulation section that demodulates a downlink control signal including a downlink scheduling assignment and an uplink scheduling grant, included in the downlink signal;
an allocation section that reserves a physical uplink shared channel resource for the second carrier by the demodulated higher layer signal, and allocates the reserved physical uplink shared channel resource to the second carrier by the demodulated downlink scheduling assignment; and
a transmission section that transmits a channel quality report triggered by the demodulated downlink scheduling assignment to the second base station apparatus using the physical uplink shared channel resource allocated to the second carrier,
wherein, when simultaneous uplink transmission by the first carrier and the second carrier is not allowed, the mobile terminal apparatus prioritizes transmitting an ACK/NACK and the channel quality report by a physical uplink shared channel allocated to an uplink of the second carrier over transmitting the ACK/NACK and the channel quality report by a physical uplink control channel allocated to the uplink of the first carrier.

13. A communication method to control a plurality of carriers such that a mobile terminal apparatus communicates with a first base station apparatus using a first carrier and communicates with a second base station apparatus using a second carrier, which is different from the first carrier, the communication method comprising the steps of:
  at the second base station apparatus, reporting at least one physical uplink shared channel resource of the second carrier by higher layer signaling to signal to the mobile terminal apparatus;
  at the second base station apparatus, triggering a channel quality by a downlink scheduling assignment to signal to the mobile terminal apparatus;
  at the mobile terminal apparatus, receiving the higher layer signaling and reserving the physical uplink shared channel resource; and
  at the mobile terminal apparatus, transmitting the channel quality report triggered by the downlink scheduling assignment to the second base station apparatus using the physical uplink shared channel resource allocated to the second carrier by the downlink scheduling assignment,
wherein, when simultaneous uplink transmission by the first carrier and the second carrier is not allowed, the mobile terminal apparatus prioritizes transmitting an ACK/NACK and the channel quality report by a physical uplink shared channel allocated to an uplink of the second carrier over transmitting the ACK/NACK and the channel quality report by a physical uplink control channel allocated to the uplink of the first carrier.

* * * * *